US011862845B2

(12) United States Patent
Byun et al.

(10) Patent No.: US 11,862,845 B2
(45) Date of Patent: Jan. 2, 2024

(54) RADIO FREQUENCY DEVICE AND ELECTRONIC DEVICE HAVING THE SAME

(71) Applicants: Samsung Display Co., Ltd., Yongin-Si (KR); UNIST(ULSAN NATIONAL INSTITUTE OF SCIENCE AND TECHNOLOGY), Ulsan (KR)

(72) Inventors: Gangil Byun, Ulsan (KR); Sangrock Yoon, Osan-si (KR); Kiseo Kim, Yongin-si (KR); Donghyee Hwang, Ulsan (KR)

(73) Assignees: SAMSUNG DISPLAY CO., LTD., Yongin-si (KR); UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 55 days.

(21) Appl. No.: 17/325,841

(22) Filed: May 20, 2021

(65) Prior Publication Data

US 2022/0069440 A1 Mar. 3, 2022

(30) Foreign Application Priority Data

Aug. 31, 2020 (KR) ........................ 10-2020-0110092

(51) Int. Cl.

*H01Q 1/24* (2006.01)
*H01Q 9/04* (2006.01)
(Continued)

(52) U.S. Cl.

CPC ............... *H01Q 1/243* (2013.01); *H01Q 1/44* (2013.01); *H01Q 5/35* (2015.01); *H01Q 9/0407* (2013.01)

(58) Field of Classification Search

CPC .......... H01Q 1/24; H01Q 1/243; H01Q 1/273; H01Q 1/38; H01Q 9/04; H01Q 9/0407;
(Continued)

(56) References Cited

U.S. PATENT DOCUMENTS 10,381,750 B2 8/2019 Jung et al.
2018/0026354 A1* 1/2018 Lin ........................ H01Q 5/335 343/702
(Continued)

FOREIGN PATENT DOCUMENTS

KR 10-2019-0019802 2/2019
KR 10-2028352 10/2019
(Continued)

OTHER PUBLICATIONS

Faisalbin Abdulmajeed N et al: "Analysis of series-fed Microstrip Array Antennas," 2016 International Conference on Wireless Communications, Signal Processing and Networking (WISPNET), IEEE, Mar. 23, 2016, pp. 47-49, XP032959566, DOI: 10.1 109/WISPNET. 2016.7566086 [retrieved on Sep. 13, 2016] (Year: 2016).*
(Continued)

*Primary Examiner* — Thai Pham
(74) *Attorney, Agent, or Firm* — F. Chau & Associates, LLC

(57) ABSTRACT

An electronic device includes a display panel including an antenna. The antenna includes a first antenna portion. A second antenna portion is spaced apart from the first antenna portion in a first direction. A plurality of intermediate antenna portions is disposed between the first antenna portion and the second antenna portion and is electrically connected to the first antenna portion and the second antenna portion. The first antenna portion includes a first pattern portion and a first line portion having a first width in a second direction crossing the first direction. The second
(Continued)

antenna portion includes a second pattern portion and a second line portion having a second width in the second direction that is larger than the first width.

23 Claims, 14 Drawing Sheets

(51) Int. Cl.
*G06F 3/041* (2006.01)
*H01Q 5/35* (2015.01)
*H01Q 1/44* (2006.01)

(58) Field of Classification Search
CPC ............ H01Q 5/30; H01Q 5/50; H01Q 21/00; H01Q 21/0075; H01Q 21/10; G06F 3/0416; G06F 3/04164; G06F 3/0443; G06F 3/0448
See application file for complete search history.

(56) References Cited

U.S. PATENT DOCUMENTS

| | | | | |
|---|---|---|---|---|
| 2019/0198979 | A1* | 6/2019 | Cao | H01Q 1/243 |
| 2019/0386379 | A1* | 12/2019 | Kuo | H01Q 9/0407 |
| 2019/0386387 | A1 | 12/2019 | Kim et al. | |
| 2020/0076035 | A1 | 3/2020 | Huh et al. | |
| 2020/0083595 | A1 | 3/2020 | Cai et al. | |
| 2021/0247871 | A1* | 8/2021 | Kim | H01Q 1/526 |
| 2021/0296788 | A1* | 9/2021 | Byun | G06F 3/0448 |
| 2021/0313691 | A1* | 10/2021 | Byun | H01L 27/323 |

FOREIGN PATENT DOCUMENTS

| | | |
|---|---|---|
| KR | 10-2020-0005010 | 1/2020 |
| KR | 10-2093326 | 3/2020 |
| KR | 10-2096417 | 4/2020 |
| WO | 2011089219 | 2/2011 |

OTHER PUBLICATIONS

Abdulmajeed N., et al., "Analysis of Series-Fed Microstrip Array Antennas", 2016, IEEE, pp. 47-49.

Syamimi Mohd Norzeli et al., "Design of High Gain Microstrip Patch Reader Array Antenna with Parasitic Elements for UHF RFID Application", International Journal of Engineering & Technology, 7 (4.35) (2018) 463-467.

Jean-Marie Floc'h et al., "On the Design of Planar Printed Dipole Array Antennas", Wireless Engineering and Technology, Wireless Engineering and Technology, 2012, 3, 203-209.

Wei Chen et al., "Spectral-Domain Moment-Method Analysis of Coplanar Microstrip Parasitic Subarrays", Microwave and Optical Technology Letters / vol. 6, No. 3, Mar. 5, 1993, pp. 157-163.

Mekala Harinath Reddy et al., "Bandwidth Enhancement of Microstrip Patch Antenna Using Parasitic Patch", 2017 IEEE International Conference on Smart Technologies and Management for Computing, Communication, Controls, Energy and Materials (ICSTM), Veltech Dr. RR & Dr. SR University, Chennai, T.N., India. Aug. 2-4, 2017. pp. 295-298.

* cited by examiner

RADIO FREQUENCY DEVICE AND ELECTRONIC DEVICE HAVING THE SAME

CROSS-REFERENCE TO RELATED APPLICATION

This application claims priority under 35 U.S.C. § 110 to Korean Patent Application No. 10-2020-0110092, filed on Aug. 31, 2020, the disclosure of which is incorporated by reference in its entirety herein.

TECHNICAL FIELD

The present inventive concepts relate to a radio frequency device capable of wideband or multiband communication and an electronic device having the same.

DISCUSSION OF RELATED ART

An electronic device may include various electronic modules. For example, the electronic device may be a mobile terminal or a wearable device and may include electronic modules, such as an antenna module, a camera module and/or a battery module. As mobile terminals become increasingly thin and wearable devices become increasingly miniaturized, the size of the space that the electronic modules are accommodated may decrease. Additionally, as electronic device are developed with increasingly high functionality and high specifications, the number of electronic modules included in the electronic device may increase.

SUMMARY

The present inventive concepts provide a radio frequency device capable of wideband or multiband communication and an electronic device having the same.

According to an embodiment of the present inventive concepts, an electronic device includes a display panel including an antenna. The antenna includes a first antenna portion. A second antenna portion is spaced apart from the first antenna portion in a first direction. A plurality of intermediate antenna portions is disposed between the first antenna portion and the second antenna portion and is electrically connected to the first antenna portion and the second antenna portion. The first antenna portion includes a first pattern portion and a first line portion having a first width in a second direction crossing the first direction. The second antenna portion includes a second pattern portion and a second line portion having a second width in the second direction that is larger than the first width.

In an embodiment, the first antenna portion, the plurality of intermediate antenna portions, and the second antenna portion may be arranged in the first direction.

In an embodiment, a first length in the first direction of the first line portion may be the same as a second length in the first direction of the second line portion.

In an embodiment, the first antenna portion may be matched at a first impedance equal to intrinsic impedance of free space, and the antenna may be matched at a second impedance lower than the first impedance.

In an embodiment, the plurality of intermediate antenna portions may include a first intermediate antenna portion, a second intermediate antenna portion, and a third intermediate antenna portion, wherein the first intermediate antenna portion is disposed between the first antenna portion and the second intermediate antenna portion, the second intermediate antenna portion is disposed between the first intermediate antenna portion and the third intermediate antenna portion, and the third intermediate antenna portion is disposed between the second antenna portion and the second intermediate antenna portion.

In an embodiment, the first line portion may connect the first pattern portion and the first intermediate antenna portion.

In an embodiment, the first intermediate antenna portion may include a first intermediate pattern portion and a first intermediate line portion having a third width in the second direction larger than the first width and smaller than the second width, the second intermediate antenna portion may include a second intermediate pattern portion and a second intermediate line portion having a fourth width in the second direction larger than the third width, and the third intermediate antenna portion may include a third intermediate pattern portion and a third intermediate line portion having a fifth width in the second direction larger than the fourth width.

In an embodiment, the second width may be larger than the fifth width.

In an embodiment, the antenna may have a mesh structure.

In an embodiment, the antenna may transmit, receive, or transmit and receive a signal having a frequency band, and the signal may be radiated through a traveling wave resonance and a standing wave resonance.

In an embodiment, the frequency band may include a first frequency and a second frequency different from the first frequency, and the signal may include a first signal having the first frequency and a second signal having the second frequency, wherein the first signal is radiated only through the traveling wave resonance, and the second signal is radiated through the traveling wave resonance and the standing wave resonance.

In an embodiment, the antenna may be provided in plurality, and the plurality of antennas may be arranged in the second direction.

According to an embodiment of the present inventive concepts, an electronic device includes a display panel including an active area and a peripheral area adjacent to the active area. An antenna is disposed on the active area and is configured to transmit, receive, or transmit and receive a signal having a frequency band. The antenna includes a plurality of antenna portions arranged in a first direction. One of the plurality of antenna portions is matched at an impedance equal to intrinsic impedance of free space. The signal is radiated through a traveling wave resonance and a standing wave resonance.

In an embodiment, the antenna portions may include a first antenna portion a second antenna portion spaced apart from the first antenna portion in the first direction, and a plurality of intermediate antenna portions disposed between the first antenna portion and the second antenna portion.

In an embodiment, the plurality of intermediate antenna portions may include a first intermediate antenna portion, a second intermediate antenna portion, and a third intermediate antenna portion, wherein the first intermediate antenna portion is disposed between the first antenna portion and the second intermediate antenna portion, the second intermediate antenna portion is disposed between the first intermediate antenna portion and the third intermediate antenna portion, and the third intermediate antenna portion is disposed between the second antenna portion and the second intermediate antenna portion.

In an embodiment, the first antenna portion may be matched at a first impedance equal to the intrinsic impedance of free space, the first antenna portion and the first intermediate antenna portion may be matched at a second impedance lower than the first impedance, the first antenna portion, the first intermediate antenna portion and the second intermediate antenna portion may be matched at a third impedance lower than the second impedance, the first antenna portion, the first intermediate antenna portion, the second intermediate antenna portion, and the third intermediate antenna portion may be matched at a fourth impedance lower than the third impedance, and the first antenna portion, the first intermediate antenna portion, the second intermediate antenna portion, the third intermediate antenna portion, and the second antenna portion may be matched at a fifth impedance lower than the fourth impedance.

In an embodiment, the electronic device may further include a sensing electrode disposed on the display panel, wherein the sensing electrode and the antenna are disposed in the same layer.

In an embodiment, the frequency band may include about 26.5 GHz (Gigahertz) to about 29.5 GHz.

According to an embodiment of the present inventive concepts, a radio frequency device includes a base layer. A first antenna portion is disposed on the base layer. A second antenna portion is disposed on the base layer and is spaced apart from the first antenna portion in a first direction. A plurality of intermediate antenna portions is disposed on the base layer and is positioned between the first antenna portion and the second antenna portion when viewed in a plane. The plurality of intermediate antenna portions is electrically connected to the first antenna portion and the second antenna portion. The first antenna portion includes a first pattern portion and a first line portion having a first width in a second direction crossing the first direction. The second antenna portion includes a second pattern portion and a second line portion having a second width in the second direction that is larger than the first width.

In an embodiment, the first antenna portion, the plurality of intermediate antenna portions, and the second antenna portion may be arranged in the first direction.

In an embodiment, the first antenna portion may be matched at a first impedance equal to intrinsic impedance of free space, and the first antenna portion, the intermediate antenna portions, and the second antenna portion may be matched at a second impedance lower than the first impedance.

In an embodiment, the plurality of intermediate antenna portions may include a first intermediate antenna portion, a second intermediate antenna portion, and a third intermediate antenna portion, wherein the first intermediate antenna portion is disposed between the first antenna portion and the second intermediate antenna portion the second intermediate antenna portion is disposed between the first intermediate antenna portion and the third intermediate antenna portion, and the third intermediate antenna portion is disposed between the second antenna portion and the second intermediate antenna portion.

In an embodiment, the first intermediate antenna portion may include a first intermediate pattern portion and a first intermediate line portion basing a third width in the second direction larger than the first width and smaller than the second width, the second intermediate antenna portion may include a second intermediate pattern portion and a second intermediate line portion having a fourth width in the second direction larger titan the third width and the third intermediate antenna portion may include a third intermediate pattern portion and a third intermediate line portion having a fifth width in the second direction larger than the fourth width.

In an embodiment, the first antenna portion, the plurality of intermediate antenna portions, and the second antenna portion may transmit, receive, or transmit and receive a signal having a frequency band, and the signal may be radiated through a traveling wave resonance and a standing wave resonance.

In an embodiment, the frequency band may include a first frequency and a second frequency different from the first frequency, and the signal may include a first signal having the first frequency and a second signal having the second frequency, wherein the first signal is radiated only through the traveling wave resonance, and the second signal is radiated through the traveling wave resonance and the standing wave resonance.

According to an embodiment of the present inventive concepts, an electronic device includes a display panel including an antenna. The antenna includes a first antenna portion disposed on a first end of the antenna and including a first pattern portion and a first line portion. The first antenna portion is matched at a first impedance equal to intrinsic impedance of free space. A second antenna portion is disposed on a second end of the antenna. The second antenna portion includes a second pattern portion and a second line portion. The second antenna portion is spaced apart from the first antenna portion in a first direction. A plurality of intermediate antenna portions is disposed between the first antenna portion and the second antenna portion and is electrically connected to the first antenna portion and the second antenna portion. Each of the plurality of intermediate antenna portions includes an intermediate pattern portion and an intermediate line portion. The first antenna portion is configured to radiate a first signal having a first frequency only through traveling wave resonance. The plurality of intermediate antenna portions is configured to radiate at least one second signal having a different frequency than the first signal through the traveling wave resonance and a standing wave resonance.

BRIEF DESCRIPTION OF THE DRAWINGS

The accompanying drawings are included to provide a further understanding of the present inventive concepts, and are incorporated in and constitute a part of this specification. The drawings illustrate embodiments of the present inventive concepts and together with the description, serve to describe principles of the inventive concept. In the drawings.

DETAILED DESCRIPTION OF EMBODIMENTS

Figure 1A:
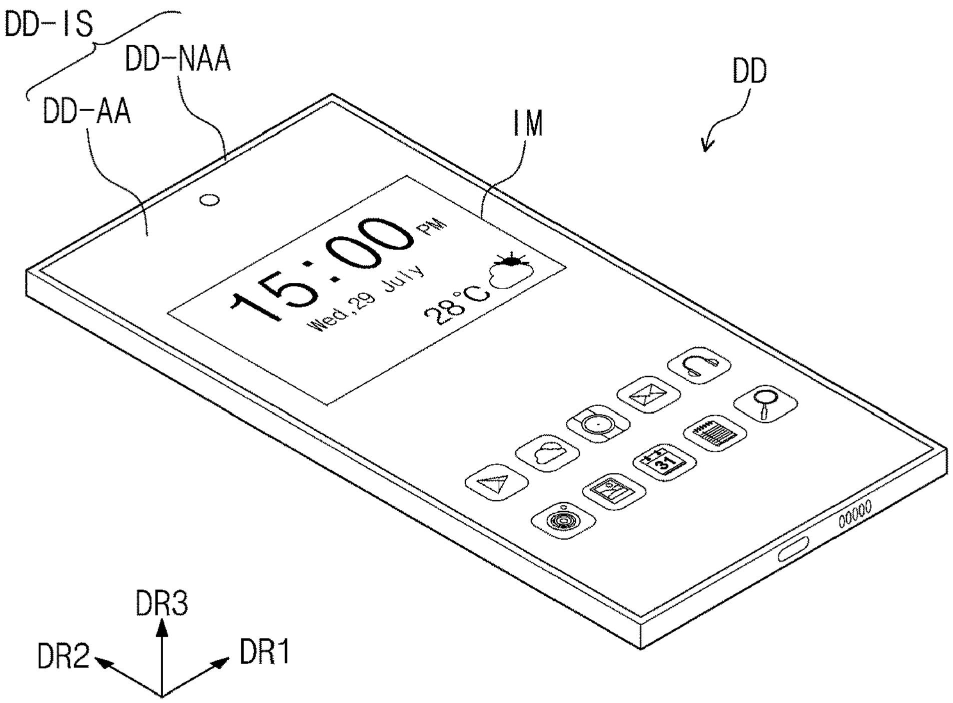
FIG. 1A is a perspective view of an electronic device according to an embodiment of the present inventive concepts.

It will be understood that when an element or layer is referred to as being "on", "connected to" or "coupled to" another element or layer, it can be directly on connected or coupled to the other dement or layer, or intervening elements or layers may be present. When an element or layer is referred to as being "directly on", "directly connected to" or "directly coupled to" another dement or layer, no intervening elements or layers may be present.

Like reference numerals refer to like elements throughout this specification. In the figures, the thicknesses, ratios and dimensions of elements may be exaggerated for convenience of description of the present inventive concepts.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. Unless otherwise defined in the specification, these terms may only be used to distinguish one element, component, region, layer or section from another element, component, region, layer or section. Thus, a first element, component, region, layer or section discussed below could be termed a second element, component, region, layer or section without departing from the teachings of the present inventive concepts. As used herein, the singular forms, "a", "an" and "the" are intended to include the plural forms as well, unless the context clearly indicates otherwise. Spatially relative terms, such as "beneath", "below", "lower", "above", and "upper", may be used herein for ease of description to describe the relationship of one element or feature to another element(s) or feature(s) as illustrated in the figures. It will be understood that the spatially relative terms are intended to encompass different orientations of the device in use or operation in addition to the orientation depicted in the figures.

Unless otherwise defined all terms (including technical and scientific terms) used herein have the same meaning as commonly understood by one of ordinary skill in the art to which the present inventive concepts belong. It will be further understood that terms, such as those defined in commonly used dictionaries should be interpreted as having a meaning that is consistent with their meaning in the context of the relevant art and will not be interpreted in an idealized or overly formal sense unless expressly so defined herein.

It will be further understood that the terms "include" or "have", when used in this specification, specify the presence of stated features, integers, steps, operations, elements, and or components, but do not preclude the presence or addition of one or more other features, integers, steps, operations, elements, components, and or groups thereof.

Hereinafter, the present inventive concepts will be explained in detail with reference to the accompanying drawings.

Figure 1B:
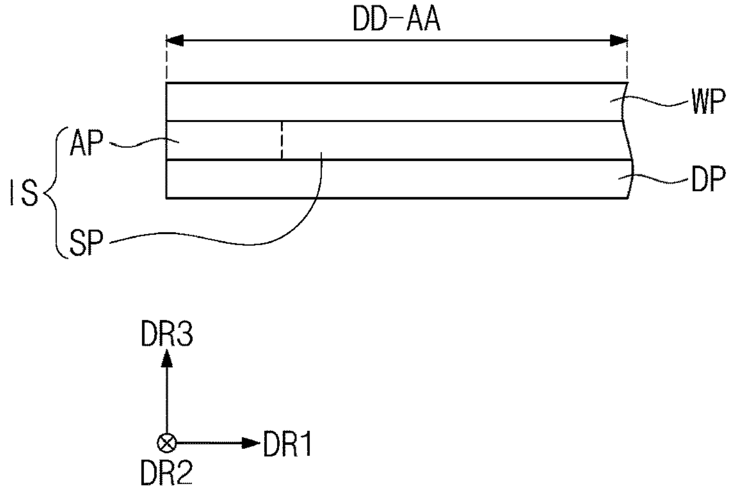
FIG. 1B is a cross-sectional view of an electronic device according to an embodiment of the present inventive concepts.

FIG. 1A is a perspective view of an electronic device according to an embodiment of the present inventive concepts, and FIG. 1B is a cross-sectional view of an electronic device according to an embodiment of the inventive concept.

Referring to the embodiments of FIG. 1A and FIG. 1B, an electronic device DD may be a device that is activated according to an electrical signal. For example, in an embodiment the electronic device DD may be a mobile phone, a tablet, a car navigation device, a game machine, or a wearable device. However, embodiments of the present inventive concepts are not limited thereto and the electronic device DD may be various other small, medium or large electronic devices. FIG. 1A illustrates the electronic device DD as a mobile phone for convenience of explanation.

The electronic device DD may display an image IM through a display surface DD-IS. The display surface DD-IS may include an active area DD-AA and a peripheral area DD-NAA adjacent to the active area DD-AA. The active area DD-AA may be an area in which the image IM is displayed. The peripheral area DD-NAA may be an area in which the image IM is not displayed. The image IM may include one or more moving image and/or still images. For example, a dock window and software icon images are illustrated in FIG. 1A as an example of the image IM. However, embodiments of the present inventive concepts are not limited thereto.

The active area DD-AA may be parallel to a surface defined by a first direction DR1 and a second direction DR2 crossing the first direction DR1. For example, as shown in the embodiment of FIG. 1A, the second direction DR2 may be perpendicular to the first direction DR1. However, embodiments of the present inventive concepts are not limited thereto. A third direction DR3 may indicate a normal direction of the active area DD-AA, that is, a thickness direction of the electronic device DD.

A front surface (e.g., a top surface) and a rear surface (e.g., a bottom surface) of each of members or units to be described below may be distinguished by the third direction DR3. The third direction DR3 may be a direction crossing the first direction DR1 and the second direction DR2. For example, the first direction DR1, the second direction DR2, and the third direction DR3 may be orthogonal to each other. However, embodiments of the present inventive concepts me not limited thereto. In addition, a surface defined by the first direction DR1 and the second direction DR2 may be defined as a plane in this specification, and "when viewed in a plane" may be defined as a state of being viewed. In the third direction DR3.

As shown in the embodiment of FIG. 1B, the electronic device DD may include a display panel DP, an input sensor IS, and a window WP.

The display panel DP may be a component that substantially generates the image IM. In an embodiment, the display panel DP may be a light emitting display panel. However, embodiments of the present inventive concepts are not limited thereto. For example, the display panel DP may include an organic light emitting display panel, a quantum dot display panel, a micro LED display panel, or a nano LED display panel.

The input sensor IS may be disposed on the display panel DP (e.g. in the third direction DR3). In an embodiment, the input sensor IS may be disposed directly on the display panel DP and the input sensor IS may be formed on the display panel DP through a continuous process. Alternatively, the input sensor IS may be bonded to the display panel DP by an adhesive member. The adhesive member may include a typical adhesive or a typical detachable adhesive. For example, the adhesive member may be an optically clear adhesive member such as a pressure sensitive adhesive (PSA) film, an optically clear adhesive (OCA) film, and an optically clear resin (OCR). However, embodiments of the present inventive concepts are not limited thereto.

A sensing area SP and an antenna area AP may be defined in the input sensor IS. Sensors for sensing an external input applied from the outside may be disposed in the sensing area SP. For example, in an embodiment, the external input may be a user input. The user input may include various types of external inputs such as a part of a user's body, light, heat, pen, and pressure. However, embodiments of the present inventive concepts are not limited thereto. When viewed in a plane, the sensing area SP may overlap the active area DD-AA.

An antenna ANT for transmitting, receiving, or transmitting and receiving a plurality of wireless communication signals, for example, a plurality of radio frequency signals may be disposed in the antenna area AP. The antenna ANT may be provided in plurality. In an embodiment, the antenna area AP may be disposed adjacent to at least one edge of the sensing area SP. In an embodiment the antenna area AP may be provided in plurality. In this embodiment, the antenna areas AP may be provided to extend from at least two edges of the sensing area SP. In an embodiment, the input sensor IS may include one sensing area SP and one to four antenna areas AP. However, embodiments of the present inventive concepts are not limited thereto and the sensing area SP and the antenna area AP may have various different numbers and configurations.

When viewed in a plane, the antenna area AP may overlap the active area DD-AA. Even in embodiments in which the electronic device DD is miniaturized or thinned, or the surface area of the peripheral area DD-NAA is reduced, a space in which the antenna area AP is to be disposed may be secured because the surface area of the active area DD-AA is secured. In an embodiment, the antenna area AP may be formed at the same time as the sensing area SP is formed. However, embodiments of the present inventive concepts are not limited thereto and the antenna area AP may be formed by a process different from that of the sensing area SP in some embodiments.

The window WP may be disposed on the input sensor IS. In an embodiment, the window WP may include an optically clear insulating material. For example, the window WP may include glass or plastic. The window WP may have a multilayer structure or a single-layer structure. For example, the window WP may include a plurality of plastic films bonded by an adhesive or may include a glass substrate and a plastic film bonded by an adhesive.

Figure 2A:
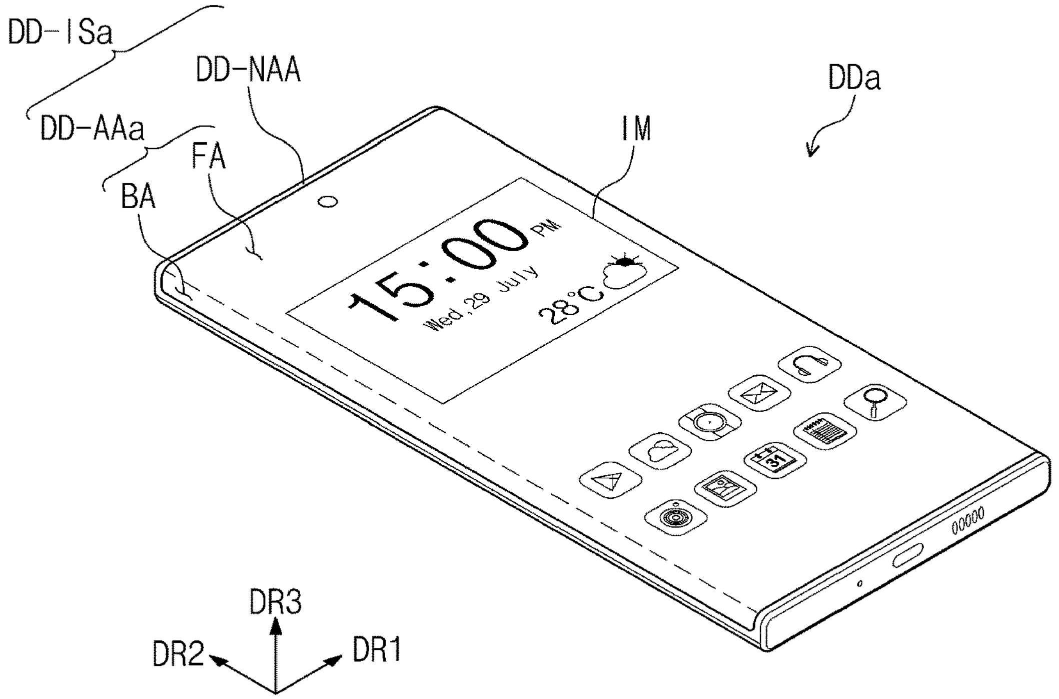
FIG. 2A is a perspective view of an electronic device according to an embodiment of the present inventive concepts.
Figure 2B:
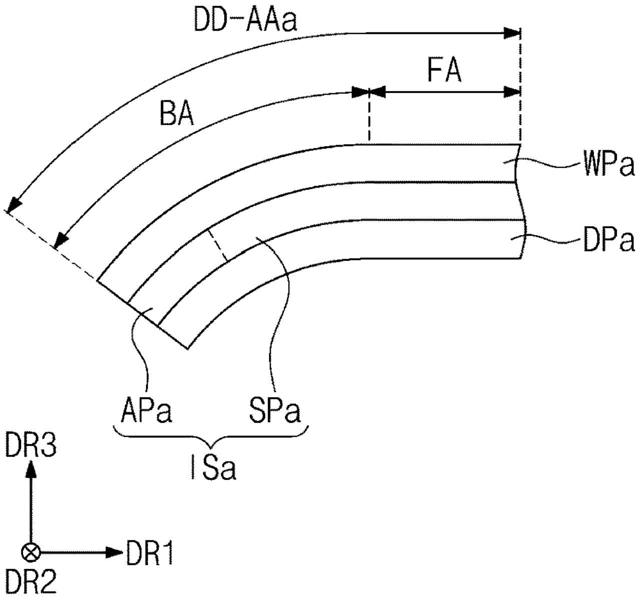
FIG. 2B is a cross-sectional view of an electronic device according to an embodiment of the present inventive concepts.

FIG. 2A is a perspective view of an electronic device according to an embodiment of the present inventive concepts, and FIG. 2B is a cross-sectional view of an electronic device according to an embodiment of the present inventive concepts. When a description is given about the embodiments of FIG. 2A and FIG. 2B, a component described with reference to the embodiments of FIG. 1A and FIG. 1B is denoted by the same reference numeral, and a repeated description thereof may be omitted for convenience of explanation.

Referring to the embodiments of FIG. 2A and FIG. 2B, an electronic device DDa may display an image IM through a display surface DD-ISa. The display surface DD-ISa may include an active area DD-AAa and a peripheral area DD-NAA adjacent to the active area DD-AAa.

As shown in the embodiment of FIG. 2A, a first active area FA and a second active area BA bent from the first active area FA may be defined in the active area DD-AAa. In an embodiment, the second active area BA may be provided in plurality. In this embodiment, the plurality of second active areas BA may be respectively provided bent from at least two sides of the first active area FA. In an embodiment, the active area DD-AAa may include one first active area FA and one to four second active areas BA. However, embodiments of the present inventive concepts are not limited thereto, and the active area DD-AAa may have various different arrangements with respect to the first active area FA and the second active areas BA.

The electronic device DDa may include a display panel DPa, an input sensor ISa, and a window WPa.

A portion of the display panel DPa overlapping the second active area BA may be bent. A sensing area SPa and an antenna area APa may be defined in the input sensor ISa. When viewed in a plane, the sensing area SPa may overlap the first active area FA and a partial portion of the second active area BA. The antenna area APa may overlap another partial portion of the second active area BA. However, embodiments of the present inventive concepts are not limited thereto.

Figure 3:
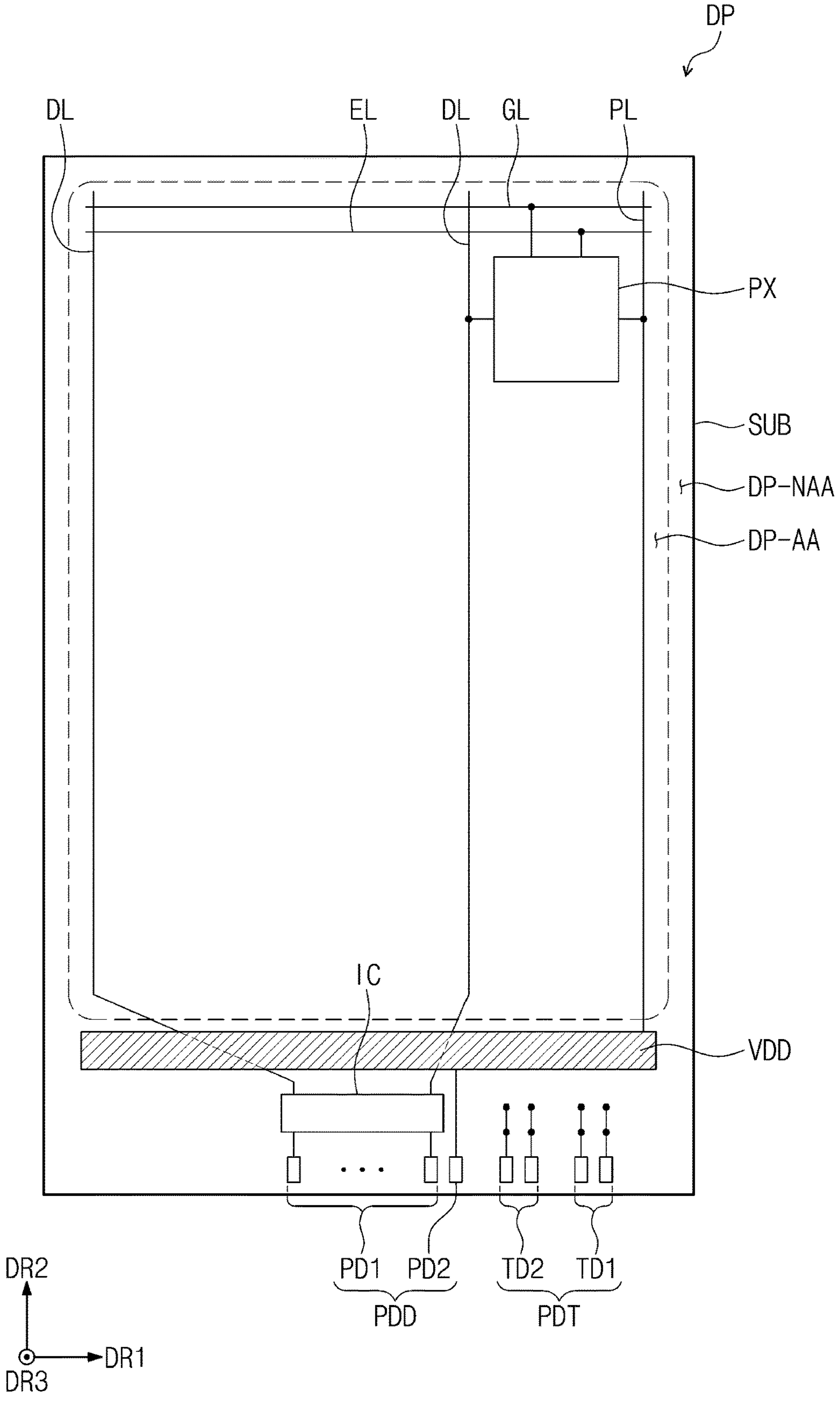
FIG. 3 is a plan view of a display panel according to an embodiment of the present inventive concepts.

FIG. 3 is a plan view of a display panel according to an embodiment of the present inventive concepts.

Referring to the embodiment of FIG. 3, an active area DP-AA and a peripheral area DP-NAA adjacent to the active area DP-AA may be defined in the display panel DP. The active area DP-AA may be an area in which the image IM (see FIG. 1A) is displayed. A plurality of pixels PX may be arranged m the active area DP-AA. The peripheral area DP-NAA may be an area in which a driving circuit, a driving line, or the like is disposed. When viewed in a plane, the active area DP-AA may overlap the active area DD-AA (see FIG. 1A) of the electronic device DD (see FIG. 1A) or the active area DD-AAa (see FIG. 2A) of the electronic device DDa (see FIG. 2A), and the peripheral area DP-NAA may overlap the peripheral area DD-NAA (see FIG. 1A and FIG. 2A).

As shown in the embodiment of FIG. 3, the display panel DP may include a base layer SUB, the plurality of pixels PX, a plurality of signal lines GL, DL, PL, and EL, a plurality of display pads PDD, and a plurality of sending pads PDT.

In an embodiment, each of the plurality of pixels PX may display one of primary colors or one of mixed colors. For example, the primary colors may include red, green, or blue.

The mixed colors may include various colors such as white yellow, cyan, and magenta. However, embodiments of the present inventive concepts are not limited thereto and a color displayed by each of the pixels PX may vary.

The plurality of signal lines, such as a plurality of scan lines GL, a plurality of data lines DL, a plurality of power lines PL, and a plurality of light emission control lines EL may be disposed on the base layer SUB. The plurality of signal lines may be connected to the plurality of pixels PX to transmit electrical signals to the plurality of pixels PX. The plurality of signal lines may include a plurality of scan lines GL, a plurality of data lines DL, a plurality of power lines PL, and a plurality of light emission control lines EL. However, embodiments of the present inventive concepts are not limited thereto and the configuration of the plurality of signal lines may vary. For example, in an embodiment of the present inventive concepts, the plurality of signal lines may further include an initialization voltage line.

A power pattern VDD may be disposed in the peripheral area DP-NAA. For example, the power pattern VDD may be disposed in a lower portion of the peripheral area DP-NAA (e.g. in the second direction DR2). However, embodiments of the present inventive concepts are not limited thereto. The power pattern VDD may be connected to the plurality of power lines PL. The display panel DP may provide the same power signal to the plurality of pixels PX by including the power pattern VDD.

The plurality of display pads PDD may be disposed in the peripheral area DP-NAA. For example, the plurality of display pads PDD may be disposed in a lower portion of the peripheral area DP-NAA (e.g. in the second direction DR2). However, embodiments of the present inventive concepts are not limited thereto. The plurality of display pads PDD may include a first pad PD1 and a second pad PD2. The first pad PD1 may be provided in plurality. The plurality of first pads PD1 may be respectively connected to the plurality of data lines DL. The second pad PD2 may be connected to the power pattern VDD to be electrically connected to the plurality of power lines PL. The display panel DP may provide the plurality of pixels PX with electrical signals provided from the outside through the plurality of display pads PDD. Meanwhile, the plurality of display pads PDD may further include pads for receiving other electrical signals in addition to the first pod PD1 and the second pad PD2, and are not limited to any one embodiment.

A driving chip IC may be mounted in the peripheral area DP-NAA. The driving chip IC may be a timing control circuit in the form of a chip. The plurality of data lines DL may be electrically connected to the plurality of first pads PD1, respectively, through the driving chip IC. However, embodiments of the present inventive concepts are not limited thereto. For example, in an embodiment the driving chip IC may be mounted on a film that is separate from the display panel DP. In this embodiment, the driving chip IC may be electrically connected to the plurality of display pads PDD through the film.

The plurality of sensing pads PDT may be disposed in the peripheral area DP-NAA. The plurality of sensing pads PDT may be electrically connected to a plurality of sensing electrodes, respectively, of the input sensor IS (see FIG. 5A) to be described later. The plurality of sensing pads PDT may include a plurality of first sensing pads TD1 and a plurality of second sensing pads TD2.

Figure 4:
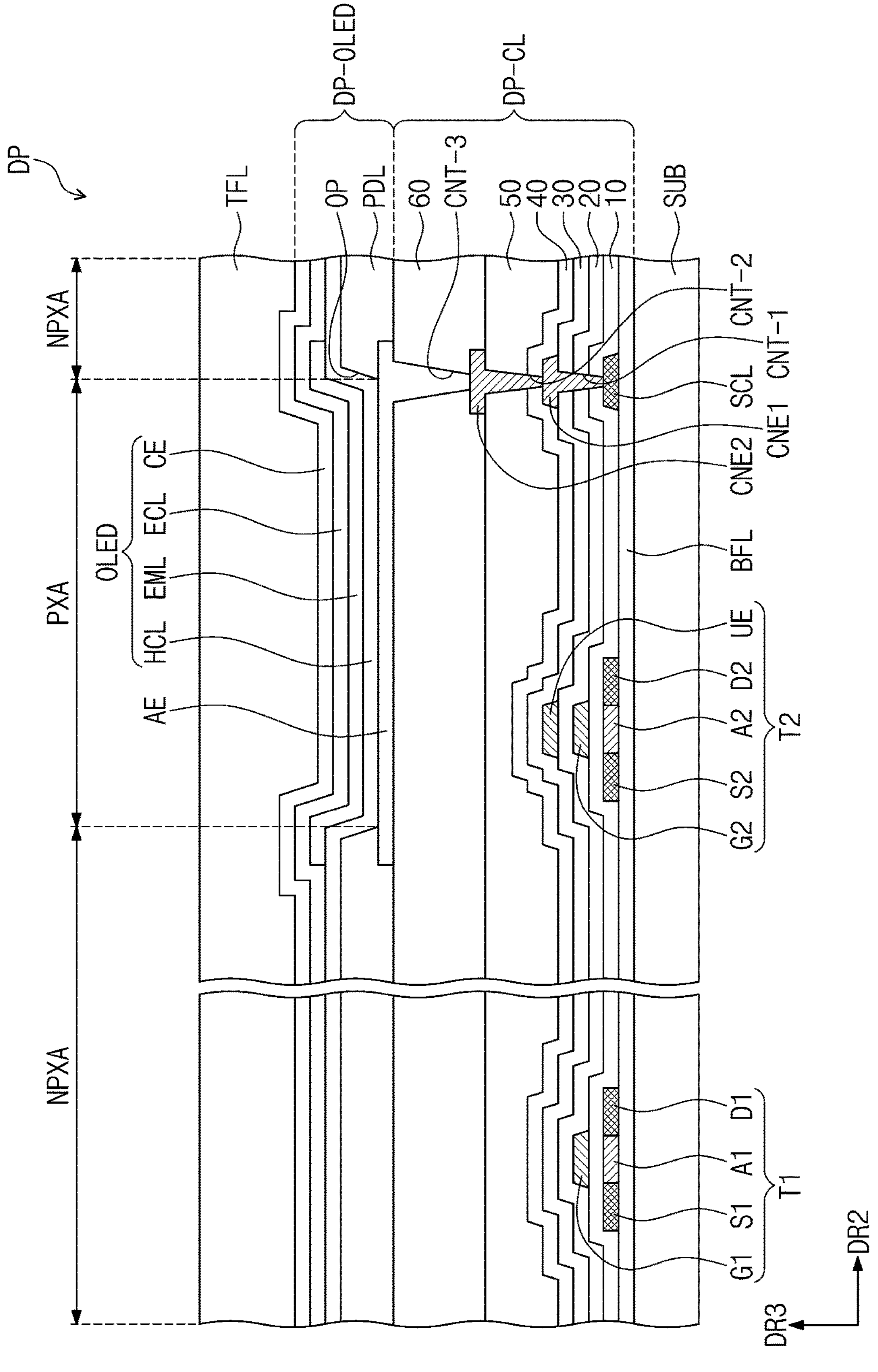
FIG. 4 is a cross-sectional view of a display panel according to an embodiment of the present inventive concepts.

FIG. 4 is a cross-sectional view of a display panel according to an embodiment of the present inventive concepts.

Referring to the embodiment of FIG. 4, the display panel DP may include the base layer SUB, a display circuit layer DP-CL, an image implementation layer DP-OLED, and a thin film encapsulation layer TFL. The display panel DP may include a plurality of insulating layers, semiconductor patterns, a conductive pattern, a signal line, and the like. In an embodiment, each of the insulating layers, a semiconductor layer, and a conductive layer may be formed in a method such as coaling and deposition. Thereafter, the insulating layer, the semiconductor layer, and the conductive layer may be selectively patterned in a photolithography method. In this method, the semiconductor patterns, the conductive pattern, the signal line, and the like, which are included in the display circuit layer DP-CL and the image implementation layer DP-OLED, may be formed. As shown in the embodiment of FIG. 4, the base layer SUB may be a base substrate supporting the display circuit layer DP-CL and the image implementation layer DP-OLED.

In an embodiment, the base layer SUB may include a synthetic resin layer. The synthetic resin layer may include thermosetting resin. The base layer SUB may have a multilayer structure. For example, the base layer SUB may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. However, embodiments of the present inventive concepts are not limited thereto. The silicon oxide layer and the amorphous silicon layer may be referred to as a base banter layer. Each of the first and second synthetic resin layers may include polyimide-based resin. Alternatively, each of the first and second synthetic resin layers may include at least one compound selected from acrylate-based resin, methacrylate-based resin, polyisoprene-based resin, vinyl-based resin, epoxy-based resin, urethane-based resin cellulose-based resin, siloxane-based resin, polyamide-based resin, and perylene-based resin. In this specification, meanwhile, "~~"-based resin means that the resin includes a functional group of "~~". In addition, the base layer SUB may include a glass substrate, an organic/inorganic composite material substrate, or the like.

At least one inorganic layer may be disposed on a top surface of the base layer SUB. In an embodiment, the inorganic layer may include at least one compound selected from aluminum oxide, titanium oxide, silicon oxide, silicon oxynitride, zirconium oxide, and hafnium oxide. The inorganic layer may be formed in multiple inorganic layers. The multiple inorganic layers may include a barrier layer and/or a buffer layer. In this embodiment, the display panel DP is illustrated as including a buffer layer BFL.

The display circuit layer DP-CL may be disposed on the base layer SUB. The display circuit layer DP-CL may provide a signal for driving a light emitting device OLED included in the image implementation layer DP-OLED. As shown in the embodiment of FIG. 4, the display circuit layer DP-CL may include the buffer layer BFL, a first transistor T1, a second transistor T2, a first insulating layer 10, a second insulating layer 20, a third insulating layer 30, a fourth insulating layer 40, a fifth insulating layer 50, and a sixth insulating layer 60.

The buffer layer BFL may increase the bonding force between the base layer SUB and each of the semiconductor patterns. In an embodiment, the buffer layer BFL may include a silicon oxide layer and a silicon nitride layer. For example, the silicon oxide layer and the silicon nitride layer may be alternately laminated.

The semiconductor pattern may be disposed on the buffer layer BFL. For example, the semiconductor pattern may be disposed directly on the buffer layer BFL (e.g., in the third direction DR3). The semiconductor pattern may include polysilicon. However, embodiments of the present inventive concepts are not limited thereto and the semiconductor pattern may include various different materials, such as amorphous silicon or metal oxide.

FIG. 4 illustrates only a partial portion of the semiconductor patterns. However, additional semiconductor patterns may be further disposed in another area of the pixel PX when viewed in a plane. In an embodiment, the semiconductor patterns may be arranged in a specific rule across the plurality of pixels PX. The semiconductor pattern may have different electrical properties depending on whether the same is doped. The semiconductor pattern may include a first region having high conductivity and a second region having low conductivity. The first region may be doped with an N-type dopant or a P-type dopant A P-type transistor may include a doped region doped with the P-type dopant, and an N-type transistor may include a doped region doped with the N-type dopant. The second region may be a non-doped region or a region doped in a lower concentration than the first region.

In an embodiment, the conductivity of the first region may be higher than the conductivity of the second region, and the first region may substantially serve as an electrode or a signal line. The second region may substantially correspond to an active (or a channel) of the transistor. For example, a partial portion of the semiconductor pattern may be the active of the transistor, another partial portion thereof may be a source or a drain of the transistor, and another partial portion thereof may be a connection electrode or a connection signal line.

In an embodiment, each of the plurality of pixels PX (see FIG. 3) may have an equivalent circuit including seven transistors, one capacitor, and a light emitting device. However, embodiments of the present inventive concepts are not limited thereto and the equivalent circuit of the pixel may have various different forms. In the embodiment of FIG. 4, the two transistors, such as the first transistor T1 and the second transistor T2, and the light emitting device OLED included in each of the plurality of pixels PX (see FIG. 3) are illustrated. The first transistor T1 may include a source S1, an active A1, a drain D1, and a gate G1. The second transistor T2 may include a source S2, an active A2, a drain D2, a gate G2, and an upper electrode UE.

The source S1, the active A1, and the drain D1 of the first transistor T1 may be formed from a semiconductor pattern of the semiconductor patterns, and the source S2, the active A2, and the drain D2 of the second transistor T2 may be formed from a semiconductor pattern of the semiconductor patterns. When viewed on the cross section, the source S1 and the drain D1 may respectively extend in opposite directions (e.g., the second direction DR2) from the active A1, and the source S2 and the drain D2 may respectively extend in opposite directions (e.g., the second direction DR2) from the active A2. FIG. 4 illustrates a portion of a connection signal line SCL formed from the semiconductor pattern. In an embodiment, the connection signal line SCL may be electrically connected to the drain D2 of the second transistor T2 when viewed in a plane.

The first insulating layer 10 may be disposed on the buffer layer BFL (e.g., directly thereon in the third direction DR3). The first insulating layer 10 may overlap the plurality of pixels PX in common and may cover the semiconductor pattern. The first insulating layer 10 may be an inorganic layer and/or an organic layer and may have a single-layer structure or a multilayer structure. In an embodiment, the first insulating layer 10 may include at least one compound selected from aluminum oxide, titanium oxide, silicon oxide, silicon oxynitride, zirconium oxide, and hafnium oxide. In this embodiment, the first insulating layer 10 may be a single-layer silicon oxide layer. In addition to the first insulating layer 10, an insulating layer of the display circuit layer DP-CL to be described later may be an inorganic layer and/or an organic layer and may have a single-layer structure or a multilayer structure. The inorganic layer may include at least one of the above-described materials.

The gates G1 and G2 may be disposed on the first insulating layer 10 (e.g., directly thereon in the third direction DR3). In an embodiment, the gates G1 and G2 may be portions of a metal pattern. The gates G1 and G2 may respectively overlap the actives A1 and A2 (e.g., in the third direction DR3). In an embodiment, in a process of doping the semiconductor patterns, the gates G1 and G2 may function as a mask.

The second insulating layer 20 may be disposed on the first insulating layer 10 (e.g., directly thereon in the third direction DR3). The second insulating layer 20 may cover the gates G1 and G2. The second insulating layer 20 may overlap (e.g. in the third direction DR3) the plurality of pixels PX in common. The second insulating layer 20 may be an inorganic layer and/or an organic layer and may have a single-layer structure or a multilayer structure. For example, the second insulating layer 20 may be a single-layer silicon oxide layer.

The upper electrode UE may be disposed on the second insulating layer 20 (e.g., directly thereon in the third direction DR3). The upper electrode UE may overlap the gate G2 (e.g. in the third direction DR3). In an embodiment, the upper electrode UE may be a portion of the metal pattern. A portion of the gate G2 and the upper electrode UE overlapping the portion may define a capacitor. However, embodiments of the present inventive concepts are not limited thereto. For example, in some embodiments, the upper electrode UE may be omitted.

The third insulating layer 30 may be disposed on the second insulating layer 20 (e.g., directly thereon in the third direction DR3) Die third insulating layer 30 may cover the upper electrode UE. In this embodiment, the third insulating layer 30 may be a single-layer silicon oxide layer. A first connection electrode CNE1 may be disposed on the third insulating layer 30. As shown in the embodiment of FIG. 4, the first connection electrode CNE1 may be connected to the connection signal line SCL through a contact hole CNT-1 penetrating the first to third insulating lavers 10, 20, and 30.

The fourth insulating layer 40 may be disposed on the third insulating layer 30 (e.g., directly thereon in the third direction DR3). The fourth insulating layer 40 may cover the first connection electrode CNE1. In an embodiment, the fourth insulating layer 40 may be a single-layer silicon oxide layer.

The fifth insulating layer 50 may be disposed on the fourth insulating layer 40 (e.g., directly thereon in the third direction DR3). In an embodiment, the fifth insulating layer 50 may be an organic layer. A second connection electrode CNE2 may be disposed on the fifth insulating layer 50. As shown in the embodiment of FIG. 4, the second connection electrode CNE2 may be connected to the first connection electrode CNE1 through a contact hole CNT-2 penetrating the fourth insulating layer 40 and the fifth insulating layer 50.

The sixth insulating layer 60 may be disposed on the filth insulating layer 50 (e.g., directly thereon om the third direction DR3). The sixth insulating layer 60 may cover the second connection electrode CNE2. In an embodiment, the sixth insulating layer 60 may be an organic layer.

As shown in the embodiment of FIG. 4, the image implementation layer DP-OLED may include a first electrode AE, a pixel defining film PDL, and the light emitting device OLED.

The first electrode AE may be disposed on the sixth insulating layer 60 (e.g., directly thereon in the third direction DR3). As shown in the embodiment of FIG. 4, the first electrode AE may be connected to the second connection electrode CNE2 through a contact hole CNT-3 penetrating the sixth insulating layer 60.

An opening OP may be defined in the pixel defining film PDL. The opening OP of the pixel defining film PDL may expose at least a partial portion of the first electrode AE. For example, as shown in the embodiment of FIG. 4, the opening OP may expose a central portion (e.g., in the second direction DR2) of the first electrode AE.

The active area DP-AA (see FIG. 3) may include a light emitting area PXA and a light blocking area NPXA adjacent to the light emitting area PXA. The light blocking area NPXA may surround the light emitting area PXA. In this embodiment, the light emitting area PXA is defined to correspond to the portion of the first electrode AE exposed by the opening OP.

A hole control layer HCL may be disposed in common in the light emitting area PXA and the light blocking area NPXA. The hole control layer HCL may include a hole transport layer and may further include a hole injection layer. A light emitting layer EML may be disposed on the hole control layer HCL (e.g., directly thereon in the third direction DR3). The light emitting layer EML may be disposed in an area corresponding to the opening OP. Accordingly, the light emitting layer EML may be separately formed in each of the pixels.

An electron control layer ECL may be disposed on the light emitting layer EML (e.g., directly thereon in the third direction DR3). In an embodiment the electron control layer ECL may include an electron transport layer and may further include an electron injection layer. In an embodiment, the hole control layer HCL and the electron control layer ECL may be formed in common in the plurality of pixels by using an open mask. A second electrode CE may be disposed on the electron control layer ECL (e.g., directly thereon in the third direction DR3). In an embodiment, the second electrode CE may base an integral shape. For example, the second electrode CE may be disposed in common in the plurality of pixels PX.

The thin film encapsulation layer TFL may be disposed on the image implementation layer DP-OLED (e.g., directly thereon in the third direction DR3) to cover the image implementation layer DP-OLED. In an embodiment, the thin film encapsulation layer TFL may include a first inorganic layer, an organic layer, and a second inorganic layer sequentially laminated in the third direction DR3. However, embodiments of the present inventive concepts are not limited thereto and the thin film encapsulation layer TFL may be variously arranged to include at least one inorganic layer and at least one organic layer. For example, the thin film encapsulation layer TFL according to an embodiment of the present inventive concepts may further include a plurality of inorganic layers and a plurality of organic layers.

The first inorganic layer may prevent external moisture or oxygen from permeating the image implementation layer DP-OLED. For example, in an embodiment, the first inorganic layer may include silicon nitride, silicon oxide or a compound thereof.

The organic layer may be disposed on the first inorganic layer to provide a flat surface. A curve formed on a top surface of the first inorganic layer or particles present on the first inorganic layer may be covered by the organic layer. For example, in an embodiment, the organic layer may include an acrylate-based organic layer. However, embodiments of the present inventive concepts are not limited thereto.

The second inorganic layer may be disposed on the organic layer to cover the organic layer. The second inorganic layer may block, moisture or the like emitted from the organic layer to prevent the moisture or the like from being introduced to the outside. In an embodiment, the second inorganic layer may include silicon nitride, silicon oxide, or a compound thereof. However, embodiments of the present inventive concepts are not limited thereto.

Figure 5A:
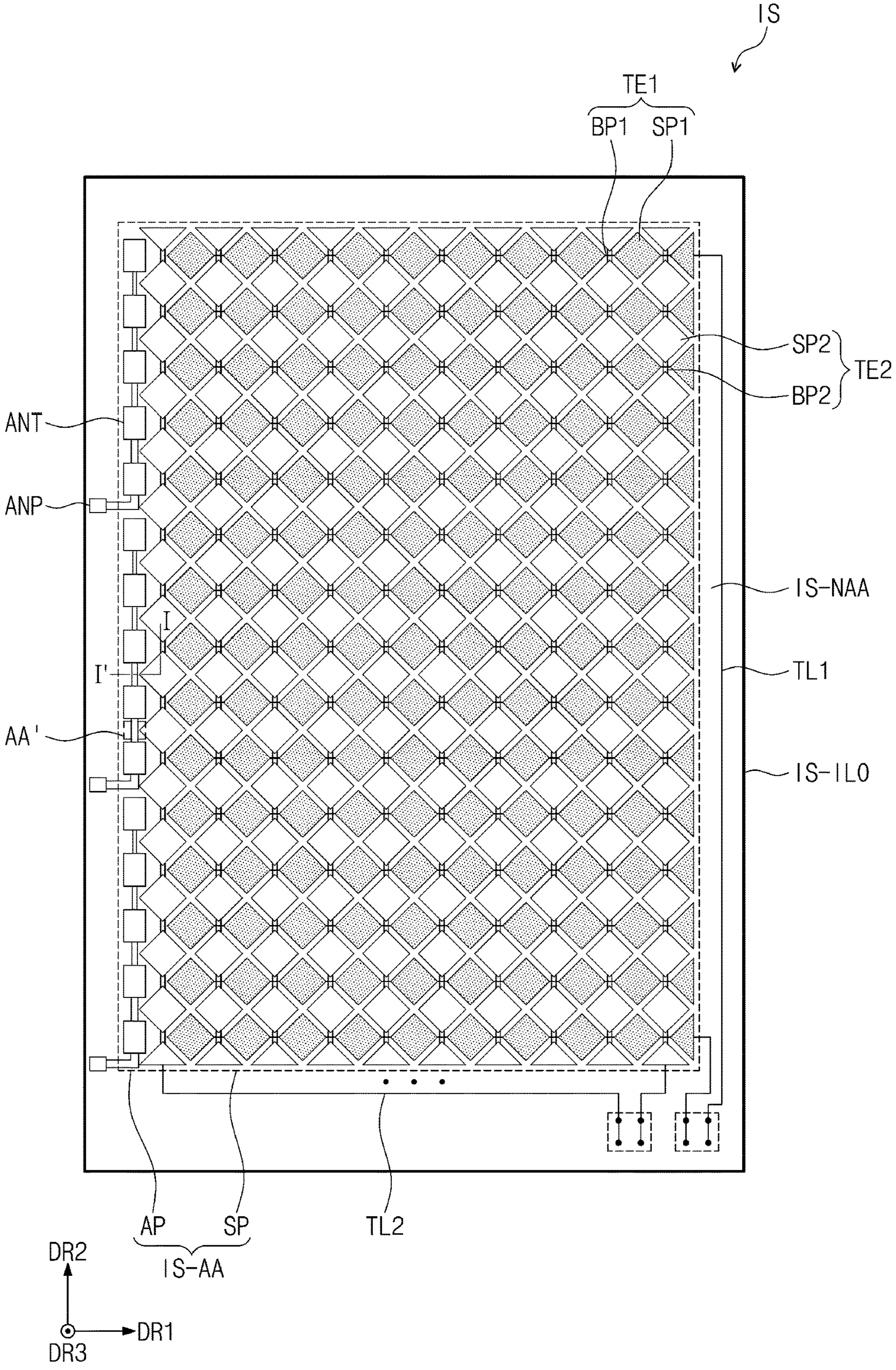
FIG. 5A is a plan view of an input sensor according to an embodiment of the present inventive concepts.
Figure 5B:
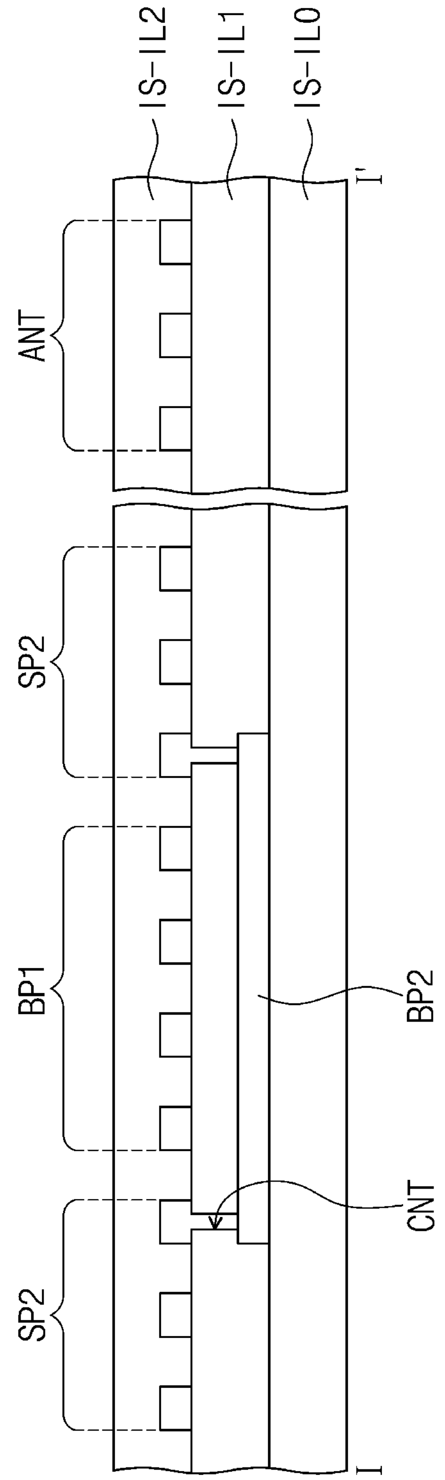
FIG. 5B is a cross-sectional view taken along line I-I' of FIG. 5A according to an embodiment of the present inventive concepts.

FIG. 5A is a plan view of an input sensor according to an embodiment of the present inventive concepts, and FIG. 5B is a cross-sectional view taken along line I-I' of FIG. 5A according to an embodiment of the inventive concepts.

Referring to the embodiments of FIG. 5A and FIG. 5B, an active area IS-AA and a peripheral area IS-NAA surrounding the active area IS-AA may be defined in the input sensor IS. For example, as shown in the embodiment of FIG. 5A, the peripheral area IS-NAA may completely surround the active area IS-AA (e.g., in the first and second directions DR1, DR2). However, embodiments of the present inventive concepts are not limited thereto. The active area IS-AA may be an area that is activated according to an electrical signal. When viewed in a plane, the active area IS-AA may overlap the active area DP-AA (see FIG. 3) of the display panel DP (see FIG. 3), and the peripheral area IS-NAA may overlap the peripheral area DP-NAA (see FIG. 3) of the display panel DP (see FIG. 3).

As shown in the embodiment of FIG. 5A, the active area IS-AA may include the sensing SP and the antenna area AP. A plurality of sensing electrodes, such as first sensing electrodes TE1 and second sensing electrodes TE2, may be disposed in the sensing area SP. The plurality of antennas ANT may be disposed in the antenna area AP. For example, as shown in the embodiment of FIG. 5A, the plurality of antennas ANT may be disposed on a left side (e.g., in the first direction DR1) in the active area IS-AA. However, embodiments of the present inventive concepts are not limited thereto and the plurality of antennas ANT may be disposed in the antenna area AP in various different regions of the active area IS-AA. The plurality of antennas ANT may be referred to as a plurality of radio frequency devices ANT which may transmit, receive or transmit and receive radio frequencies. A dummy pattern may be further disposed in the antenna area AP. The dummy pattern may reduce a difference in reflectance between an area in which each of the antennas ANT is disposed and an area in which the antenna ANT is not disposed. Accordingly, the dummy pattern may prevent the antenna ANT from being viewed from the outside by a user.

The input sensor IS may include a base insulating layer IS-IL0, the plurality of sensing electrodes, such as the first sensing electrodes TE1 and the second sensing electrodes TE2, a plurality of sensing lines, such as first sensing lines TL1 and second sensing lines TL2, the plurality of antennas ANT, and a plurality of antenna pads ANP.

In an embodiment, the base insulating layer IS-IL0 may be an inorganic layer including at least one compound selected from silicon nitride, silicon oxynitride, and silicon oxide. In an embodiment, the base insulating layer IS-IL0 may be an organic layer including at least one material selected from epoxy resin, acrylic resin and imide-based resin. In an embodiment, the base insulating layer IS-IL0 may be directly formed on the display panel DP (see FIG. 1B). However, embodiments of the present inventive concepts are not limited thereto. For example, in another embodiment, the base insulating layer IS-IL0 may be bonded to the display panel DP (see FIG. 1B) by an adhesive member.

The plurality of sensing electrodes, such as the first sensing electrodes TE1 and the second sensing electrodes TE2, may be disposed in the sensing area SP. In an embodiment, the plurality of sensing electrodes may include the plurality of first sensing electrodes TE1 and the plurality of second sensing electrodes TE2. The input sensor IS may obtain information about an external input through a change in capacitance between the plurality of first sensing electrodes TE1 and the plurality of second sensing electrodes TE2.

As shown in the embodiment of FIG. 5A, each of the plurality of first sensing electrodes TE1 may extend in the first direction DR1. The plurality of first sensing electrodes TE1 may be arranged in the second direction DR2. Each of the plurality of first sensing electrodes TE1 may include a plurality of first ports SP1 and a plurality of second parts BP1.

Each of the plurality of second sensing electrodes TE2 may extend in the second direction DR2. The plurality of second sensing electrodes TE2 may be arranged in the first direction DR1. Each of the plurality of second sensing electrodes TE2 may include a plurality of sensing patterns SP2 and a plurality of bridge patterns BP2.

In the embodiment of FIG. 5A, each sensing pattern SP2 includes two bridge patterns BP2 that are connected to adjacent sensing patterns SP2. However, embodiments of the present inventive concepts are not limited thereto and the plurality of bridge patterns BP2 and the plurality of sensing patterns SP2 may vary in other embodiments. For example, two adjacent sensing patterns SP2 may be connected to each oilier by one bridge pattern BP2.

In an embodiment, the plurality of second parts BP1 may be disposed in a layer that is different from the layer that the plurality of bridge patterns BP2 are disposed thereon. For example, the plurality of bridge patterns BP2 may cross the plurality of first sensing electrodes TE1 in an insulated manner. For example, the plurality of second parts BP1 may respectively cross the plurality of bridge patterns BP2 in an insulated manner.

As shown in the embodiment of FIG. 5B, the plurality of bridge patterns BP2 may be disposed on the base insulating layer IS-IL0. For example, a lower surface of the plurality of bridge patterns BP2 may directly contact an upper surface of the base insulating layer IS-IL0. A first insulating layer IS-IL1 may be disposed on the base insulating layer IS-IL0. The first insulating layer IS-IL1 may cover the plurality of bridge patterns BP2. For example, as shown in the embodiment of FIG. 5B, the first insulating layer IS-IL1 may be disposed directly on an upper surface of the base insulating layer IS-IL0 and an upper and lateral sides surfaces of the bridge patterns BP2. The first insulating layer IS-IL1 may include an inorganic material, an organic material, or a composite material.

As shown in the embodiment of FIG. 5B, the plurality of sensing patterns SP2, the plurality of first parts SP1, the plurality of second parts BP1, and the plurality of antennas ANT may be disposed on the first insulating layer IS-IL1. For example, the plurality of sensing patterns SP2, the plurality of first parts SP1, the plurality of second parts BP1, and the plurality of antennas ANT may be disposed directly on the first insulating layer IS-IL1. The plurality of antennas ANT may be disposed in the same layer as the plurality of sensing patterns SP2, the plurality of first parts SP1, and the plurality of second parts BP1. For example, in an embodiment, the plurality of sensing patterns SP2, the plurality of first parts SP1, the plurality of second parts BP1, and the plurality of antennas ANT may have a mesh structure.

A plurality of contact holes CNT may be formed by penetrating the first insulating layer IS-IL1 in a thickness direction. For example, the thickness direction may be parallel to the third direction DR3 (see FIG. 5A). Two adjacent sensing patterns SP2 among the plurality of sensing patterns SP2 may be electrically connected to a bridge patient BP2 through the plurality of contact holes CNT. For example, as shown in the embodiment of FIG. 5B, lower surfaces of the adjacent sensing patterns SP2 may contact the bridge patterns BP2 through the contact holes CNT.

A second insulating layer IS-IL2 may be disposed on the first insulating layer IS-IL1. For example, the second insulating layer IS-IL2 may be disposed directly on an tipper surface of the first insulating layer IS-IL1 and an upper surface and lateral side surfaces of the plurality of sensing patterns SP2, the plurality of first parts SP1, the plurality of second parts BP1, and the plurality of antennas ANT. The second insulating layer IS-IL2 may cover the plurality of sensing patterns SP2, the plurality of first parts SP1, the plurality of second parts BP1, and the plurality of antennas ANT. The second insulating layer IS-IL2 may have a single-layer structure or a multilayer structure. The second insulating layer IS-IL2 may include an inorganic material, an organic material, or a composite material.

Although the embodiment of FIG. 5B includes a bottom bridge structure in which the plurality of bridge patterns BP2 are disposed below the plurality of sensing patterns SP2, the plurality of first parts SP1, and the plurality of second parts BP1, embodiments of the present inventive concepts are not limited thereto and the structure of the input sensor IS may vary. For example, the input sensor IS according to an embodiment of the present inventive concepts may have a top bridge structure in which the plurality of bridge patterns BP2 are disposed above the plurality of sensing patterns SP2, the plurality of first parts SP1, and the plurality of second parts BP1 and upper surfaces of the plurality of sensing patterns SP2 may contact the bridge patterns BP2.

Although the embodiment of FIG. 5B exemplarily illustrates the plurality of antennas ANT disposed on the first insulating layer IS-IL1 and covered by the second insulating layer IS-IL2, the structure of the plurality of antennas ANT according to an embodiment of the present inventive concepts is not limited thereto. For example, in an embodiment of the present inventive concepts, the plurality of antennas ANT may be disposed on the base insulating layer IS-IL0 and covered by the first insulating layer IS-IL1. For example, the base insulating layer IS-IL0 may directly contact an upper surface and lateral side surfaces of each of the plurality of antennas ANT.

The plurality of sensing lines may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

The plurality of first sensing pads TD1 (see FIG. 3) may be electrically connected to the plurality of first sensing lines TL1, respectively, through contact holes. The plurality of second sensing pads TD2 (see FIG. 3) may be electrically connected to the plurality of second sensing lines TL2, respectively, through contact holes.

The plurality of antennas ANT may be electrically connected to the plurality of antenna pads ANP, respectively.

In an embodiment, the plurality of antennas ANT may include the same material as at least some of the plurality of first and second sensing electrodes TE1 and TE2, and may be formed through the same process as at least some of the plurality of first and second sensing electrodes TE1 and TE2. For example, in an embodiment, the plurality of first sensing electrodes TE1 and the plurality of antennas ANT may include carbon nanotubes, metal and or a metal alloy, or a composite material thereof, and may have a single-layer structure or a multilayer structure in which titanium (Ti), aluminum (Al), and titanium (Ti) are sequentially laminated. However, embodiments of the present inventive concepts are not limited thereto, and the plurality of antennas ANT according to an embodiment of the present inventive concepts may include a material different from the material of the plurality of first sensing electrodes TE1, and may be formed through a process separate from the process of forming the plurality of first sensing electrodes TE1. For example, the plurality of first sensing electrodes TE1 may have a multilayer structure in which titanium (Ti), aluminum (Al), and titanium (Ti) are sequentially laminated, and the plurality of antennas ANT may include carbon nanotubes, metal and/or a metal alloy, or a composite material thereof and may have a single-layer structure or a multilayer structure. For example, the metal material may be at least one compound selected from silver (Ag), copper (Cu), aluminum (Al), gold (Au), and platinum (Pt). However, embodiments of the present inventive concepts are not limited thereto.

The plurality of antennas ANT may further include at least one ground electrode disposed below the base insulating layer IS-IL0. However, embodiments of the present inventive concepts are not limited thereto and the structure of the ground electrode may vary. For example, in an embodiment of the present inventive concepts, the ground electrode may be the second electrode CE (see FIG. 4) of the display panel DP (see FIG. 4).

The plurality of antenna pads ANP may supply different power levels to the plurality of antennas ANT through the plurality of antenna pads ANP. Therethrough, beamforming of the plurality of antennas ANT may be adjusted. The beamforming may be to form a radio wave beam so that the plurality of antennas ANT have directionality to radiate or receive a signal in a desired specific direction.

In an embodiment, the signal radiated or received by the plurality of antennas ANT may be a super high frequency (SHF) signal or an extremely high frequency (EHF) signal having a band of high frequencies. A signal having a band of high frequencies has, in terms of characteristics of the signal, a shorter propagation distance and a lower power of penetration than a signal having a band of low frequencies. According to an embodiment of the present inventive concepts, however, the beamforming of the plurality if antennas ANT may be adjusted by adjusting the power supplied to each of the plurality of antennas ANT. By concentrating a signal that the plurality of antennas ANT receive, transmit, or transmit and receive towards a specific direction, the level of the energy may be increased, and a desired radiation pattern may be formed. Accordingly, the electronic device DD (see FIG. 1A) may be provided which has an increased transmission distance for the signal.

Further, according to an embodiment of the present inventive concepts, the plurality of antennas ANT may constitute an array antenna, and an array gain may be increased and interference reduction may be increased. The array gain is a gain obtainable when maximizing a signal to noise ratio (SNR) of a desired received signal among signals transmitted through multiple channels by using spatial signal processing while the channel information of the signals is known. The interference reduction is a gain obtainable by attenuating a signal subject to relatively large interference among signals transmitted through multiple paths. Accordingly, it may the electronic device DD (see FIG. 1A) may have an increased antenna gain.

Although the embodiment of FIG. 5A includes three antennas ANT and three antenna pads ANP, the number of each of the plurality of antennas ANT and the plurality of antenna pads ANP according to an embodiment of the present inventive concepts are not limited thereto. For example, the numbers of the antennas ANT and the antenna pads ANP may be two or four or more in embodiments of the present inventive concepts.

Figure 6:
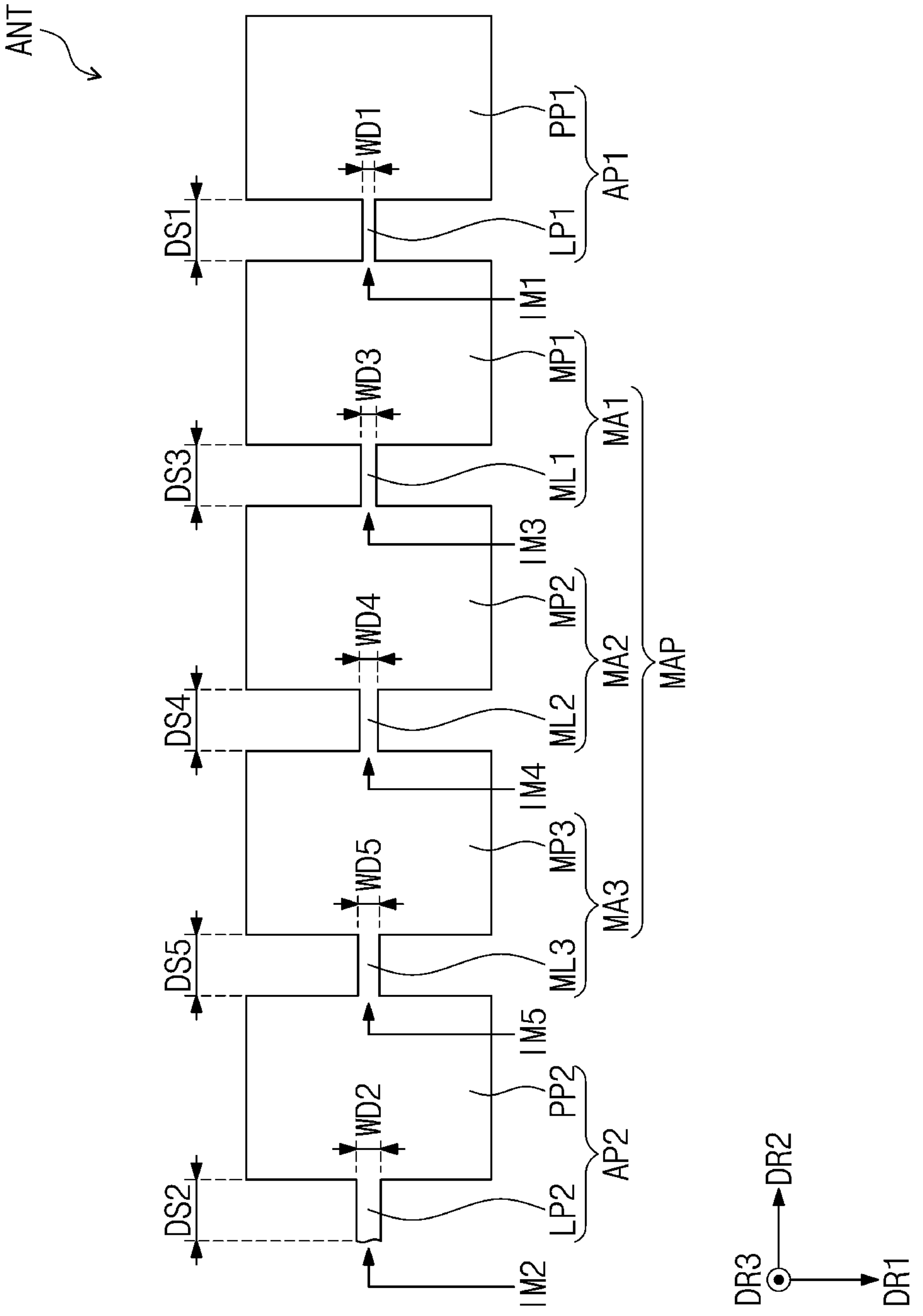
FIG. 6 illustrates one of a plurality of antennas according to an embodiment of the present inventive concepts.
Figure 7A:
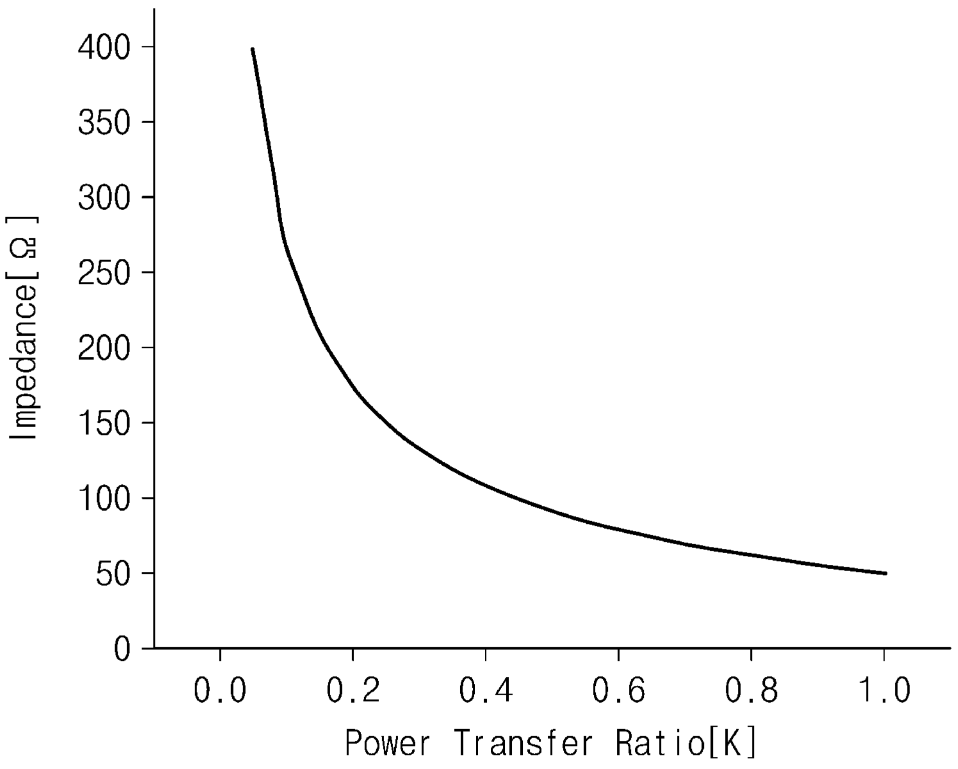
FIG. 7A is a graph showing characteristic impedance and a power transfer ratio according to an embodiment of the present inventive concepts.
Figure 7B:
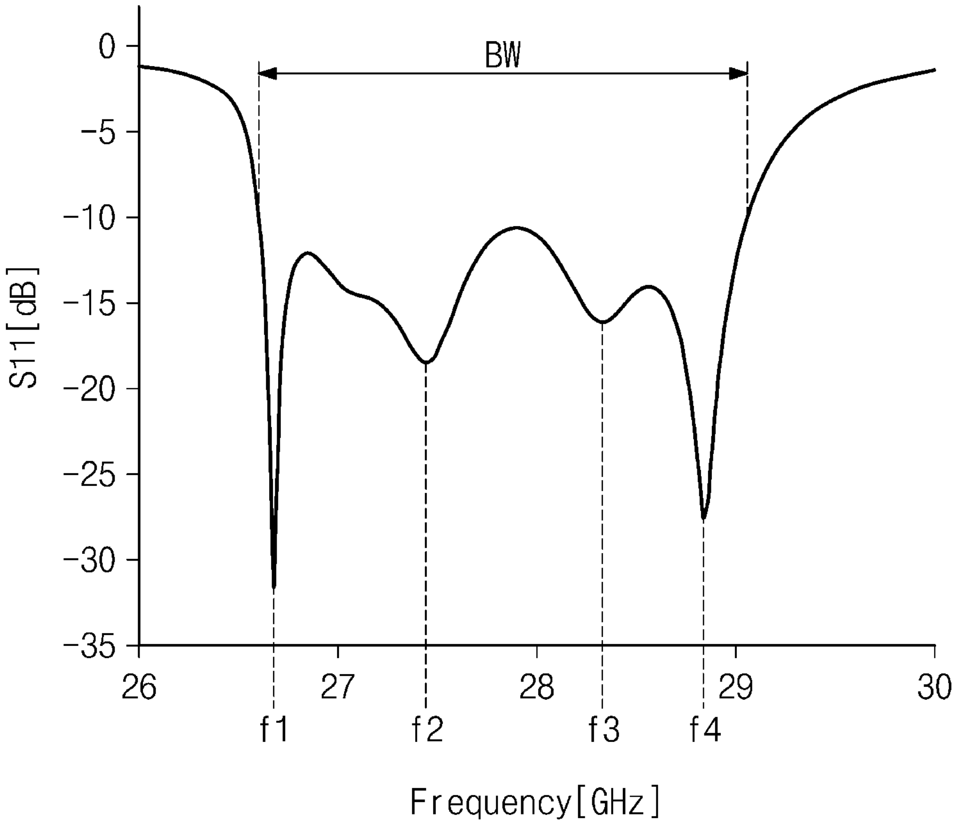
FIG. 7B is a graph showing an S-parameter according to frequency of one of antennas according to an embodiment of the present inventive concepts.
Figure 7C:
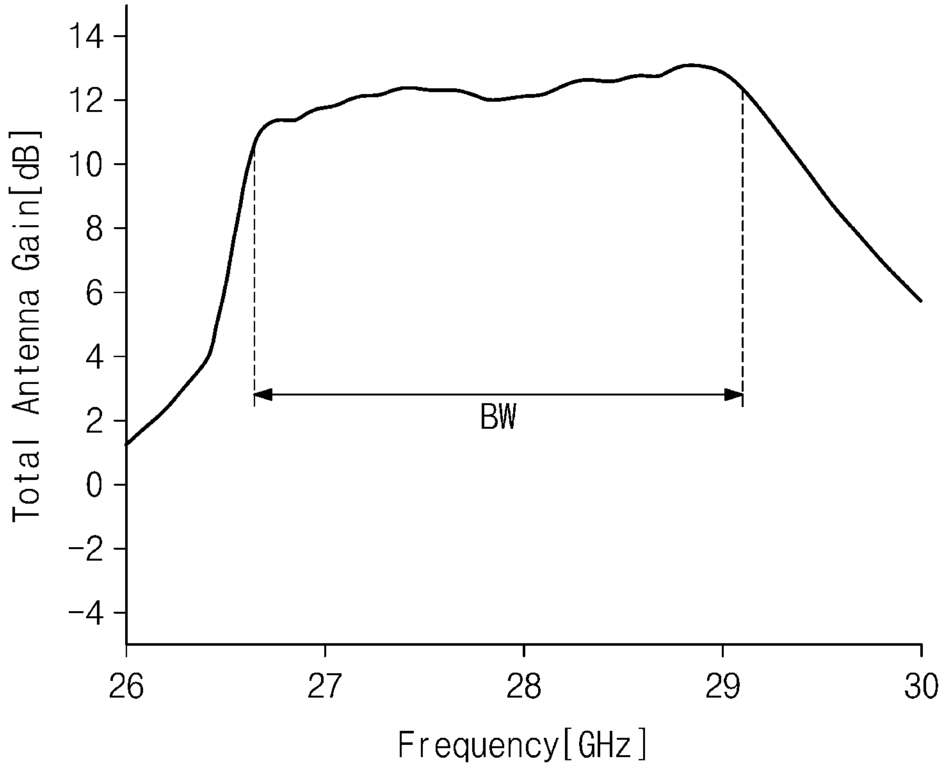
FIG. 7C is a graph showing a total gain according to frequency of one of antennas according to an embodiment of the present inventive concepts.

FIG. 6 illustrates one of a plurality of antennas according to an embodiment of the present inventive concepts. FIG. 7A is a graph showing characteristic impedance and a power transfer ratio according to an embodiment of the present inventive concepts. FIG. 7B is a graph showing an S-parameter according to frequency of one of the antennas according to an embodiment of the present inventive concepts. FIG. 7C is a graph showing a total gain according to frequency of one of the antennas according to an embodiment of the present inventive concepts.

Referring to the embodiments of FIG. 6 to FIG. 7C, the antenna ANT may be configured to transmit, receive, or transmit and receive a signal having a frequency band BW (FIG. 7B). As shown in the embodiment of FIG. 7B, the frequency band BW may include a first frequency f1, a second frequency f2, a third frequency f3, and a fourth frequency f4.

As shown in the embodiment of FIG. 6, the antenna ANT may include a first antenna portion AP1, a plurality of intermediate antenna portions MAP, and a second antenna portion AP2.

The first antenna portion AP1 may be disposed at a first end of the antenna ANT. The first antenna portion AP1 may include a first pattern portion PP1 and a first line portion LP1 extending from one side of the first pattern portion PP1 in the second direction DR2. The size of the first pattern portion PP1 may be vary according to a desired frequency of a signal to be transmitted, received, or transmitted and received.

The second antenna portion AP2 may be disposed on a second end of the antenna ANT which is opposite (e.g., in the second direction DR2) to the first end of the antenna ANT. The second antenna portion AP2 may be connected to an antenna pad ANP (see FIG. 5A). The second antenna portion AP2 may be spaced apart from the first antenna portion AP1 in the second direction DR2. The second antenna portion AP2 may include a second pattern portion PP2 and a second line portion LP2 extending from one side of the second pattern portion PP2 in the second direction DR2. As shown in the embodiment of FIG. 6, the size of the second pattern portion PP2 may be substantially the same as the size of the first pattern portion PP1. However, embodiments of the present inventive concepts are not limited thereto and the size of the second pattern portion PP2 may be different from the sizes of the first pattern portion PP1.

The plurality of intermediate antenna portions MAP may be disposed between the first antenna portion AP1 and the second antenna portion AP2 (e.g., in the second direction DR2). As shown in the embodiment of FIG. 6, the plurality of intermediate antenna portions MAP may include a first intermediate antenna portion MA1, a second intermediate antenna portion MA2, and a third intermediate antenna portion MA3.

The first intermediate antenna portion MA1 may be disposed between the first antenna portion AP1 and the second intermediate antenna portion MA2 (e.g., in the second direction DR2). As shown in the embodiment of FIG. 6, the first intermediate antenna portion MA1 may include a first intermediate pattern portion MP1 and a first intermediate line portion ML1 extending from one side of the first intermediate pattern portion MP1 in the second direction DR2. In an embodiment, the size of the first intermediate pattern portion MP1 may be substantially the same as the size of the first pattern portion PP1. However, embodiments of the present inventive concepts are not limited thereto, and the size of the first intermediate pattern portion MP1 may be different from the sire of the first pattern portion PP1 in some embodiments.

The second intermediate antenna portion MA2 may be disposed between the first intermediate antenna portion MA1 and the third intermediate antenna portion MA3 (e.g., in the second direction DR2). The second intermediate antenna portion MA2 may include a second intermediate pattern portion MP2 and a second intermediate line portion ML2 extending in the second direction DR2. As shown in the embodiment of FIG. 6, the size of the second intermediate pattern portion MP2 may be substantially the same as the size of the first pattern portion PP1. However, embodiments of the present inventive concepts are not limited thereto and the size of the second intermediate pattern portion MP2 may be different from the size of the first pattern portion PP1 in some embodiments.

The third intermediate antenna portion MA3 may be disposed between the second antenna portion AP2 and the second intermediate antenna portion MA2 (e.g., in the second direction DR2). The third intermediate antenna portion MA3 may include a third intermediate pattern portion MP3 and a third intermediate line portion ML3 extending from one side of the third intermediate pattern portion MP3 in the second direction DR2. As shown in the embodiment of FIG. 6, the size of the third intermediate pattern portion MP3 may be substantially the same as the size of the first pattern portion PP1. However embodiments of the present inventive concepts are not limited thereto and the size of the third intermediate pattern portion MP3 may be different from the size of the first pattern portion PP1 in some embodiments.

Although the embodiment of FIG. 6 includes three intermediate antenna portions MAP, the number of the intermediate antenna portions MAP according to an embodiment of the present inventive concepts is not limited thereto. For example, the number of the intermediate antenna portions MAP may be vary according to a desired frequency hand of a signal to be transmitted, received, or transmitted and received. For example, the number of the plurality of intermediate antenna portions MAP may be two or four or more in some embodiments. Furthermore, although the embodiment of FIG. 6 shows the first antenna portion AP1, the intermediate antenna portions MAP and the second antenna portion AP2 arranged in the second direction DR2 with respect to each other, the first antenna portion AP1, the intermediate antenna portions MAP anti the second antenna portion AP2 may have various different arrangements with respect to each other. For example, the first antenna portion AP1, the intermediate antenna portions MAP and the second antenna portion AP2 may be arranged with respect to each other in another specific direction, such as the first direction DR1 or a direction between the first and second directions DR1, DR2. Additionally, the antenna ANT may have a various different shapes.

As shown in the embodiment of FIG. 6, the first antenna portion AP1, the first intermediate antenna portion MA1, the second intermediate antenna portion MA2, the third intermediate antenna portion MA3, and the second antenna portion AP2 may be arranged in the second direction DR2.

The first line portion LP1 may connect the first pattern portion PP1 and the first intermediate pattern portion MP1 to each other. For example, the first line portion LP1 may extend from one side of the first pattern portion PP1 to an adjacent side of the first intermediate pattern portion MP1. The first intermediate line portion ML1 may connect the first intermediate pattern portion MP1 and the second intermediate pattern portion MP2. For example, the first intermediate line portion ML1 may extend from one side of the first intermediate pattern portion MP1 to an adjacent side of the second intermediate pattern portion MP2. The second intermediate line portion ML2 may connect the second intermediate pattern portion MP2 and the third intermediate pattern portion MP3. For example, the second intermediate line portion ML2 may extend from one side of the second intermediate pattern portion MP2 to an adjacent side of the third intermediate pattern portion MP3. The third intermediate line portion ML3 may connect the third intermediate pattern portion MP3 and the second pattern portion PP2. For example, the third intermediate line portion ML3 may extend from one side of the third intermediate pattern portion MP3 to an adjacent side of the second pattern portion PP2. However, embodiments of the present inventive concepts are not limned thereto. The first line portion LP1 may have a first length DS1 in the second direction DR2. The second line portion LP2 may have a second length DS2 in the second direction DR2. In an embodiment, the first length DS1 may be substantially the same as the second length DS2.

The first intermediate line portion ML1 may have a third length DS3 in the second direction DR2. The second intermediate line portion ML2 may have a fourth length DS4 in the second direction DR2. The third intermediate line portion ML3 may have a fifth length DS5 in the second direction DR2. In an embodiment, the third length DS3, the fourth length DS4, and the fifth length DS5 may be substantially the same as the first length DS1 and the second length DS2.

The first line portion LP1 may have a first width WD1 in the first direction DR1. The second line portion LP2 may have a second width WD2 in the first direction DR1. The first intermediate line portion ML1 may have a third width WD3 in the first direction DR1. The second intermediate line portion ML2 may have a fourth width WD4 in the first direction DR1. The third intermediate line portion ML3 may have a fifth width WD5 in the first direction DR1.

As shown in the embodiment of FIG. 6, the first width WD1 may be smaller than the third width WD3. The third width WD3 may be smaller than the fourth width WD4. The fourth width WD4 may be smaller than the fifth width WD5. The fifth width WD5 may be smaller than the second width WD2.

In the embodiment of FIG. 7B, S11 may be one of S-parameters. S11 may be a ratio of strength of a reflected signal resulting from the reflection of an input signal to strength of the input signal. When determining the operation of the antenna ANT, an S11 value of about −10 dB may serve as a reference value. The value of about −10 dB may refer to a case in which the strength of the reflected signal resulting from the reflection of the input signal is about 10% of the strength of the input signal.

In an embodiment, when S11 is less than about −10 dB, the antenna ANT may be determined as operating at a corresponding frequency. When the antenna ANT is referred to as operating at a frequency, the antenna ANT may resonate at the frequency.

The antenna ANT including the first line portion LP1, the second line portion LP2, the first intermediate line portion ML1, the second intermediate line portion ML2 and the third intermediate line portion ML3 having the first width WD1 to the fifth width WD5, respectively, may transmit, receive, or transmit and receive a signal having the frequency band BW including the first frequency f1, the second frequency f2, the third frequency f3, and the fourth frequency f4. The signal may be radiated in the third direction DR3 through a standing wave resonance and a traveling wave resonance. For example, in an embodiment the frequency band BW may include about 26.5 GHz (Gigahertz) to about 29.5 GHz and may have a bandwidth in a range of about 2.5 GHz to about 3 GHz.

The first antenna portion AP1 may be matched at a first impedance IM1 equal to intrinsic impedance of free space. The first width WD1 may determine characteristic impedance at which the first antenna portion AP1 is matched. The intrinsic impedance of free space may be about 377Ω. For example, in an embodiment, the first impedance IM1 may be about 377Ω.

The first line portion LP1 may be configured so that a signal of the first frequency f1 is radiated only through the traveling wave resonance. For example, the signal of the first frequency f1 may be radiated without a reflected portion of the signal through the first antenna portion AP1 matched at the first impedance IM1 equal to the intrinsic impedance of free space. In this case, the signal may be referred to as a first signal. As shown in the embodiment of FIG. 7B, the first frequency f1 may be a frequency in a range between about 26 GHz to about 27 GHz. For example, the first frequency f1 may be about 26.68 GHz.

The first intermediate pattern portion MP1, the second intermediate pattern portion MP2, the third intermediate pattern portion MP3, and the second pattern portion PP2 may operate at the first frequency f1.

The antenna ANT may be matched at a second impedance IM2. For example, the first antenna portion AP1, the first intermediate antenna portion MA1, the second intermediate antenna portion MA2, the third intermediate antenna portion MA3 and the second antenna portion AP2 may be matched at the second impedance IM2. The second width WD2 may determine characteristic impedance at which the antenna ANT is matched. For example, in an embodiment, the second impedance IM2 may be about 50Ω.

Characteristic impedance of the antenna pad ANP (sec FIG. 5A) may be about 50Ω. The second antenna portion AP2 and the antenna pad ANP (sec FIG. 5A) may be impedance matched to each other. According to an embodiment of the present inventive concepts, transmission efficiency of a signal may be increased between the second antenna portion AP2 and the antenna pad ANP (see FIG. 5A). Accordingly, the electronic device DD (see FIG. 1A) with increased communication efficiency may be provided.

The second line portion LP2 may be configured so that a signal of the fourth frequency f4 is radiated through the standing wave resonance. The fourth frequency f4 may be a frequency between about 28.5 GHz and about 29 GHz. For example, the fourth frequency f4 may be about 28.86 GHz.

The first intermediate pattern portion MP1, the second intermediate pattern portion MP2, the third intermediate pattern portion MP3, and the second pattern portion PP2 may operate at the fourth frequency f4.

The first antenna portion AP1 and the first intermediate antenna portion MA1 may be matched at a third impedance IM3. The third width WD3 may determine characteristic impedance at which the first antenna portion AP1 and the first intermediate antenna portion MA1 are matched. In an embodiment, the third impedance IM3 may be lower than the first impedance IM1.

The first intermediate line portion ML1 may be configured so that, at the second frequency f2, a partial portion of a signal is reflected and the remaining portion thereof is transmitted. For example, the third width WD3 may be configured so that a third impedance IM3 is obtained which has a first power transfer ratio for which, referring to FIG. 7A, about 75% of the signal having the second frequency f2 is reflected and about 25% thereof is transmitted. For example, in an embodiment, the third impedance IM3 may be about 150Ω.

The first intermediate line portion ML1 may be configured so that the signal of the second frequency f2 is radiated through the traveling wave resonance and the standing wave resonance. For example, the signal of the second frequency f2 may be partially reflected at the first intermediate antenna portion MA1 matched at the third impedance IM3 having the first power transfer ratio, and a reflected portion of the signal may be radiated through the standing wave resonance, and a transmitted portion of the signal may be radiated through the traveling wave resonance. In this case, the signal may be referred to as a second signal. In an embodiment, the second frequency f2 may be a frequency in a range of between about 27 GHz to about 28 GHz. For example, the second frequency f2 may be about 27.44 GHz.

The first pattern portion PP1, the second intermediate pattern portion MP2, the third intermediate pattern portion MP3, and the second pattern portion PP2 may operate at the second frequency f2.

The first antenna portion AP1, the first intermediate antenna portion MA1, and the second intermediate antenna portion MA2 may be matched at a fourth impedance IM4. The fourth width WD4 may determine characteristic impedance at which the first antenna portion AP1, the first intermediate antenna portion MA1, and the second intermediate antenna portion MA2 are matched. In an embodiment, the fourth impedance IM4 may be lower than the third impedance IM3.

The second intermediate line portion ML2 may be configured so that, at the third frequency f3, a partial portion of a signal is reflected and the remaining portion thereof is transmitted. For example, the fourth width VD4 may be designed so that a fourth impedance IM4 is obtained which has a second power transfer ratio for which, referring to the embodiment of FIG. 7A, about 50% of the signal having the third frequency f3 is reflected and about 50% thereof is transmitted. For example, in an embodiment the fourth impedance IM4 may be about 91.42Ω.

The second intermediate line portion ML2 may be confirmed so that the signal of the third frequency f3 is radiated through the traveling wave resonance and the standing wave resonance. For example, the signal of the third frequency f3 may be partially reflected at the second intermediate antenna portion MA2 matched at the fourth impedance IM4 having the second power transfer ratio, and a reflected portion of the signal may be radiated through the standing wave resonance, and a transmitted portion of the signal may be radiated through the traveling wave resonance. In an embodiment, the third frequency f3 may be a frequency in a range of between about 28 GHZ and about 28.5 GHz. For example, the third frequency f3 may be about 28.14 GHz.

The first pattern portion PP1, the first intermediate pattern portion MP1, the third intermediate pattern portion MP3, and the second pattern portion PP2 may operate at the third frequency f3.

The first antenna portion AP1, the first intermediate antenna portion MA1, the second intermediate antenna portion MA2, and the third intermediate antenna portion MA3 may be matched at a fifth impedance IM5. The fifth width WD5 may determine characteristic impedance at which the first antenna portion AP1, the first intermediate antenna portion MA1, the second intermediate antenna portion MA2, and the third intermediate antenna portion MA3 are matched. The fifth impedance IM5 may be lower than the fourth impedance IM4 and higher than the second impedance IM2.

The third intermediate line portion ML3 may be configured so that, at the fourth frequency f4, a partial portion of a signal is reflected and the remaining portion thereof is transmitted. For example, the fifth width WD5 may be designed so that a fifth impedance IM5 is obtained which has a third power transfer ratio for which, referring to the embodiment of FIG. 7A, about 25% of the signal having the fourth frequency f4 is reflected and about 75% thereof is transmitted. For example, the fifth impedance IM5 may be about 65.47Ω.

According to an embodiment of the present inventive concepts, a total antenna gain of the antenna ANT may be increased in the frequency band BW by the first pattern portion PP1, the first intermediate pattern portion MP1, the second intermediate pattern portion MP2, the third intermediate pattern portion MP3, and the second pattern portion PP2 connected to each other in the second direction DR2. For example as shown in the embodiment of FIG. 7C, the total antenna gam may be maintained at about 12 dB in the frequency band BW. Accordingly, the antenna ANT with reduced loss may be provided in transmitting, receiving, or transmitting and receiving a signal.

According to an embodiment of the present inventive concepts, the directionality of the antenna ANT may be increased by the first pattern portion PP1, the first intermediate pattern portion MP1, the second intermediate pattern portion MP2, the third intermediate pattern portion MP3, and the second pattern portion PP2 connected to each other in the second direction DR2. The directionality may be a property of the antenna ANT having a directional concentration. For example, the antenna ANT having increased directionality may easily receive, transmit, or transmit and receive a signal having directionality. The antenna ANT may have increased concentration of the antenna gain. Accordingly, the electronic device DD (see FIG. 1A) may be provided which has, for a signal, increased communication efficiency and transmission distance.

In addition, according to an embodiment of the present inventive concepts, the bandwidth of a signal the antenna ANT transmits, receives, or transmits and receives may be increased by the first pattern portion PP1, the first intermediate pattern portion MP1, the second intermediate pattern portion MP2, the third intermediate pattern portion MP3, and the second pattern portion PP2 connected to each other in the second direction DR2.

Figure 8:
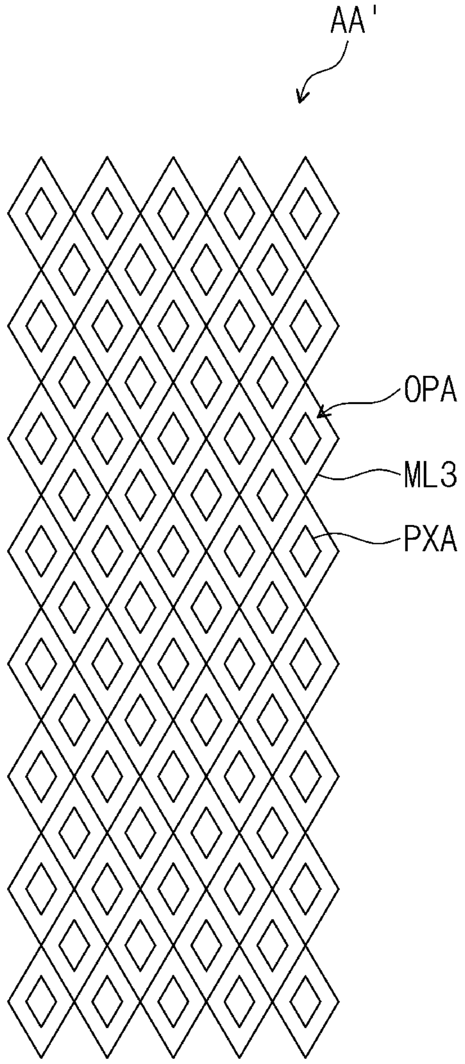
FIG. 8 is a plan view illustrating an area AA' of FIG. 5A according to an embodiment of the present inventive concepts.

FIG. 8 is a plan view illustrating an area AA' of FIG. 5A according to an embodiment of the present inventive concepts. When a description is given about the embodiment of FIG. 8, a component described with reference to the embodiments of FIG. 4 and FIG. 6 is denoted by the same reference numeral, and a repeated description thereof may be omitted for convenience of explanation.

Referring to the embodiment of FIG. 8, the third intermediate line portion ML3 may have a mesh structure. Although FIG. 8 exemplarily illustrates the third intermediate line portion ML3, a description of the third intermediate line portion ML3 given with reference to the embodiment of FIG. 8 may also be applied to the antenna ANT (see FIG. 5A). Thus, the antenna ANT (see FIG. 5A) may have a mesh structure.

The third intermediate line portion ML3 may be disposed in the active area DP-AA (see FIG. 3) of the display panel DP (see FIG. 3). The third intermediate line portion ML3 may not overlap with the light emitting area PXA. Light emitted from the plurality of pixels PX (see FIG. 3) may pass through the third intermediate line portion ML3. Accordingly, the image IM (see FIG. 1A) provided in the active area DP-AA (see FIG. 3) may be outputted to the outside through a plurality of openings OPA defined in the third intermediate line portion ML3. The light emitting area PXA may be provided in plurality. When viewed in a plane, the plurality of openings OPA may overlap the light emitting areas PXA.

The mesh structure may refer to a structure in which the plurality of openings are defined in a predetermined layer. The shape of the antenna ANT (see FIG. 5A) may be changed variously in the active area IS-AA (sec FIG. 5A), and the design freedom of the antenna ANT (see FIG. 5A) may be increased.

Figure 9A:
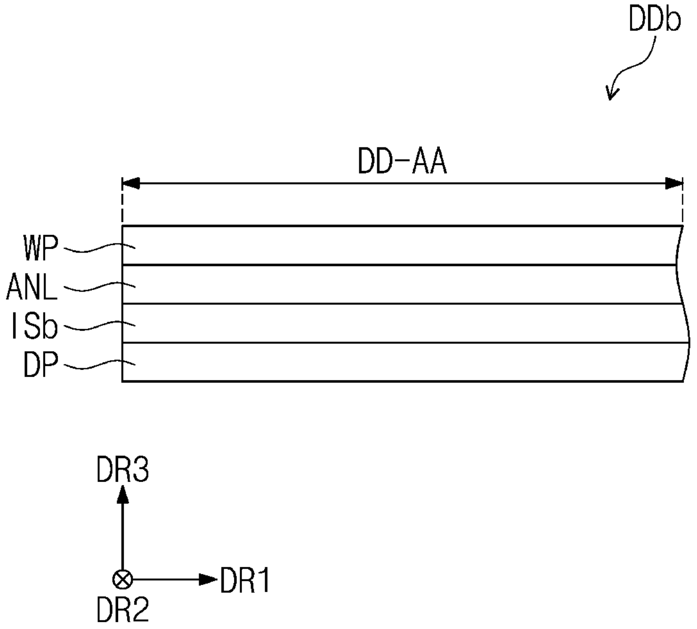
FIG. 9A is a cross-sectional view of an electronic device according to an embodiment of the present inventive concepts.
Figure 9B:
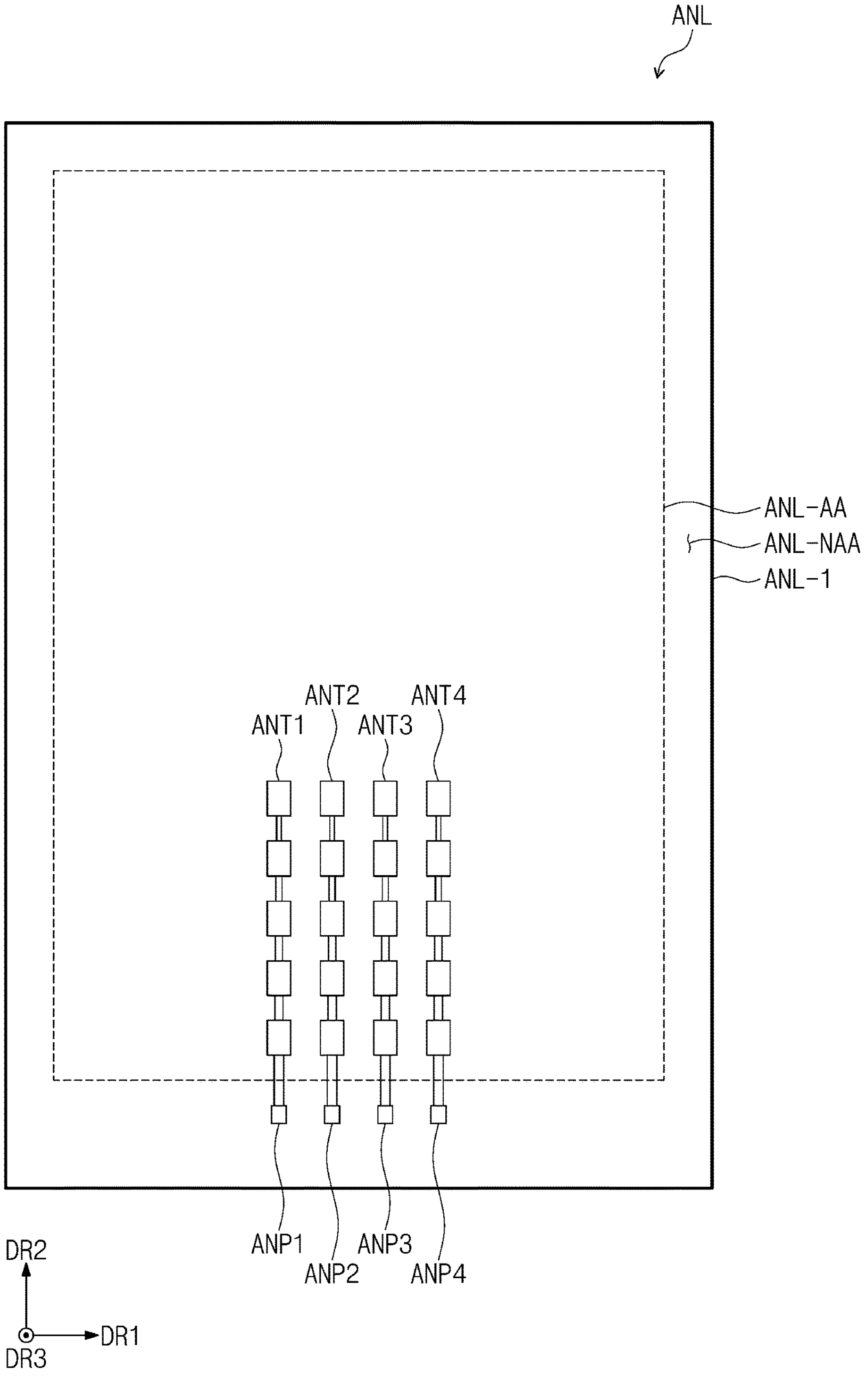
FIG. 9B is a plan view illustrating an antenna layer according to an embodiment of the present inventive concepts.

FIG. 9A is a cross-sectional view of an electronic device according to an embodiment of the present inventive concepts, and FIG. 9B is a plan view illustrating an antenna layer according to an embodiment of the present inventive concepts. When a description is given about the embodiment of FIG. 9A, a component described with reference to the embodiment of FIG. 1B is denoted by the same reference numeral, and a repeated description thereof may be omitted for convenience of explanation.

Referring to the embodiments of FIG. 9A and FIG. 9B, an electronic device DDb may include a display panel DP, an input sensor ISb, an antenna layer ANL, and a window WP.

The input sensor ISb may be disposed on the display panel DP. For example, the input sensor ISb may be disposed directly on the display panel DP. The input sensor ISb may sense an external input applied from the outside. For example, the external input may be a user input. However, embodiments of the present inventive concepts are not limited thereto and the user input may include various types of external inputs such as a part of a user's body, light, heat, pen, and pressure.

According to an embodiment of the present inventive concepts, the antenna layer ANL may be disposed on the input sensor ISb. For example, the antenna layer ANL may be disposed directly on the input sensor ISb. In an embodiment, the antenna layer ANL may be formed on the input sensor ISb through a continuous process. Alternatively, the antenna layer ANL may be bonded to the input sensor ISb by an adhesive member. The adhesive member may include a typical adhesive or a typical detachable adhesive. For example, the adhesive member may be an optically clear adhesive member such as a pressure sensitive adhesive (PSA) film, an optically clear adhesive (OCA) film, and an optically clear resin (OCR). However, embodiments of the present inventive concepts are not limited thereto.

The antenna layer ANL may be disposed between the input sensor ISb and the window WP (e.g., in the third direction DR3). An active area ANL-AA and a peripheral area ANL-NAA surrounding the active area ANL-AA may be defined in the antenna layer ANL. For example, as shown in the embodiment of FIG. 9B, the peripheral area ANL-NAA may completely surround the active area ANL-AA (e.g., in the first and second directions DR1, DR2). When viewed in a plane, the active area ANL-AA may overlap the active area DP-AA (see FIG. 3) of the display panel DP (see FIG. 3), and the peripheral area ANL-NAA may overlap the peripheral area DP-NAA (sec FIG. 3) of the display panel DP (see FIG. 3). A plurality of antennas, such as first to fourth antennas ANT1, ANT2, ANT3, and ANT4, may be disposed in the active area ANL-AA. A plurality of antenna pads, such as first to fourth antenna pads ANP1, ANP2, ANP3, and ANP4, may be disposed in the peripheral area ANL-NAA.

The plurality of antennas, such as the first to fourth antennas ANT1, ANT2, ANT3, and ANT4, and the plurality of antenna pads, such as the first to fourth antenna pads ANP1, ANP2, ANP3, and ANP4, may be disposed on a base layer ANL-1.

The plurality of antennas, such as the first to fourth antennas ANT1, ANT2, ANT3, and ANT4, may be electrically connected to the plurality of antenna pads, such as the first to fourth antenna pads ANP1, ANP2, ANP3, and ANP4, respectively.

The plurality of antennas, such as the first to fourth antennas ANT1, ANT2, ANT3, and ANT4 may extend longitudinally in the second direction DR2 and may be arranged in the first direction DR1. However, embodiments of the present inventive concepts are not limited thereto, and a direction in which the plurality of antennas, such as the first to fourth antennas ANT1, ANT2, ANT3, and ANT4, are arranged and extend may vary. For example, the first to fourth antennas ANT1, ANT2, ANT3, and ANT4 may also be arranged in the second direction DR2 and may extend longitudinally in the first direction DR1.

The plurality of antenna pads, such as the first to fourth antenna pads ANP1, ANP2, ANP3, and ANP4 may supply different powers respectively to the plurality of antennas, such as the first to fourth antennas ANT1, ANT2, ANT3, and ANT4. Therethrough, beamforming of the plurality of antennas, such as the first to fourth antennas ANT1, ANT2, ANT3, and ANT4 may be adjusted. The beamforming may be to form a radio wave beam so that the plurality of antennas, such as the first to fourth antennas ANT1, ANT2, ANT3, and ANT4, have directionality to radiate or receive a signal in a desired specific direction.

In an embodiment, the signal may be a super high frequency (SHF) signal or an extremely high frequency (EHF) signal having a band of high frequencies. According to an embodiment of the present inventive concepts, however, the beamforming of the plurality of antennas, such as the first to fourth antennas ANT1, ANT2, ANT3, and ANT4 may be adjusted by adjusting power supplied to each of the plurality of antennas, and energy may be increased by concentrating a signal toward a specific direction. In addition, radiation efficiency may be increased because a desired radiation pattern may be formed. Accordingly, the electronic device DD (see FIG. 1A) having an increased transmission distance for the signal may be provided.

Further, according to an embodiment of the present inventive concepts, the plurality of antennas, such as the first to fourth antennas ANT1, ANT2, ANT3, and ANT4, may constitute an array antenna, and an array gain may be increased and interference reduction may be increased. Accordingly, the electronic device DD (see FIG. 1A) with an increased antenna gain may be provided.

Figure 9C:
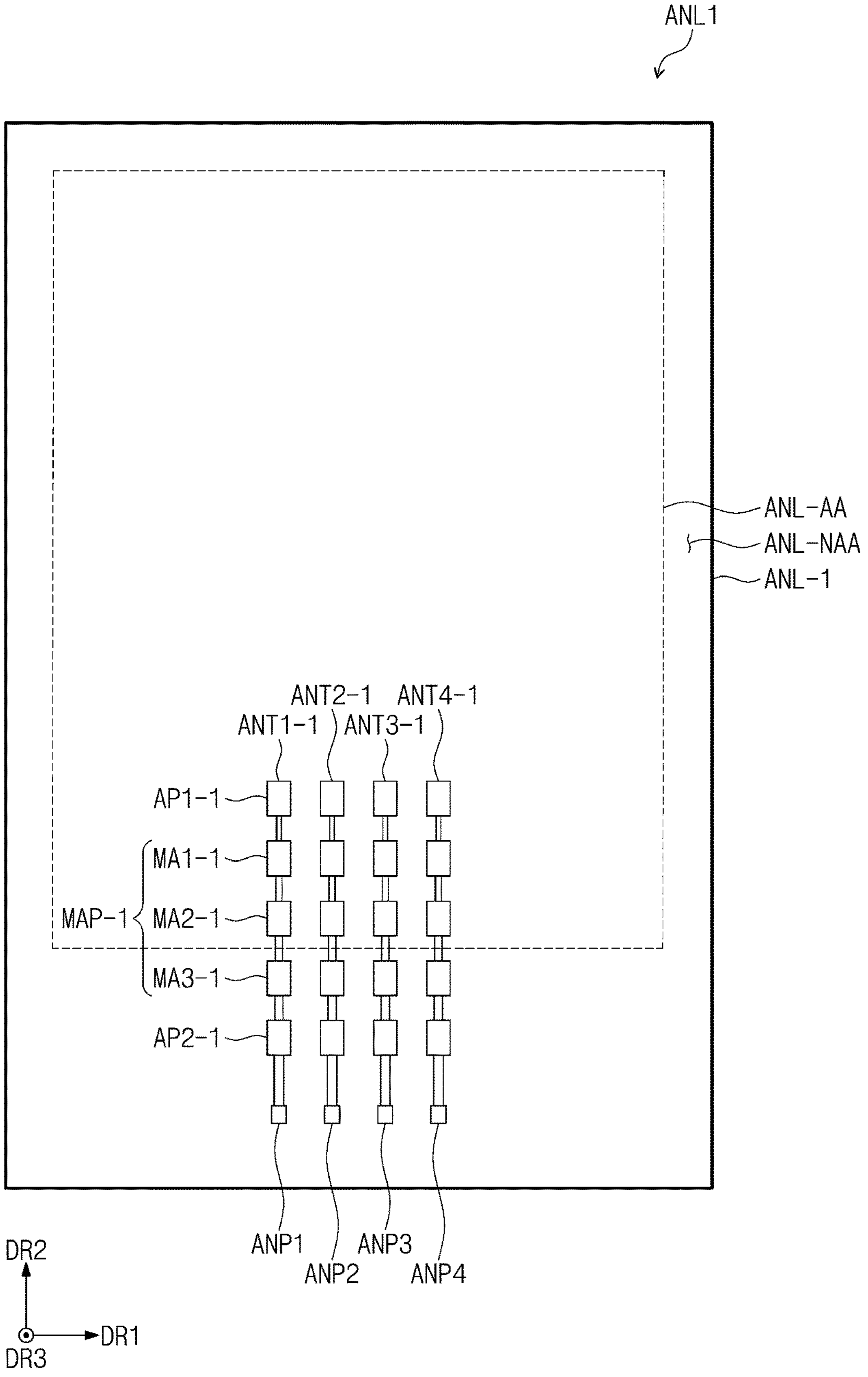
FIG. 9C is a plan view illustrating an antenna layer according to an embodiment of the present inventive concepts.

FIG. 9C is a plan view illustrating an antenna layer according to an embodiment of the present inventive concepts. When a description is given about FIG. 9C, a component described with reference to FIG. 9B is denoted by the same reference numeral, and a repeated description thereof may be omitted for convenience of explanation.

Referring to the embodiments of FIG. 9A and FIG. 9C, a plurality of antennas, such as first to fourth antennas ANT1-1, ANT2-1, ANT3-1, and ANT4-1, and a plurality of antenna pads, such as first to fourth antenna pads ANP1, ANP2, ANP3, and ANP4, may be disposed on a base layer ANL-1.

The plurality of antennas, such as the first to fourth antennas ANT1-1, ANT2-1, ANT3-1, and ANT4-1, may be electrically connected to the plurality of antenna pads, such as the first to fourth antenna pads ANP1, ANP2, ANP3, and ANP4, respectively.

The plurality of antennas, such as the first to fourth antennas ANT1-1, ANT2-1, ANT3-1, and ANT4-1, may be arranged in the first direction DR1 and may extend longitudinally in the second direction DR2. However, the direction in which the plurality of antennas, such as the first to fourth antennas ANT1-1, ANT2-1, ANT3-1, and ANT4-1, are arranged and extend may vary. For example, the plurality of antennas, such as the first to fourth antennas ANT1-1, ANT2-1, ANT3-1, and ANT4-1, may also be arranged in the second direction DR2.

Each of the plurality of antennas, such as the first to fourth antennas ANT1-1, ANT2-1, ANT3-1, and ANT4-1, may include a first antenna portion AP1-1, a second antenna portion AP2-1, and a plurality of intermediate antenna portions MAP-1 disposed therebetween (e.g., in the second direction DR2). The plurality of intermediate antenna portions MAP-1 may include a first intermediate antenna portion MA1-1, a second intermediate antenna portion MA2-1, and a third intermediate antenna portion MA3-1.

As shown in the embodiment of FIG. 9C, each of the plurality of antennas, such as the first to fourth antennas ANT1-1, ANT2-1, ANT3-1, and ANT4-1, may be disposed in an active area ANL-AA and a peripheral area ANL-NAA. For example, as shown in the embodiment of FIG. 9C, an upper portion (e.g., in the second direction DR2) of each of the plurality of antennas, such as the first to fourth antennas ANT1-1, ANT2-1, ANT3-1, and ANT4-1, may be disposed in the active area ANL-AA, and the remaining portion thereof, such as a lower portion (e.g., in the second direction DR2) may be disposed in the peripheral area ANL-NAA. For example, the first antenna portion AP1-1, the first intermediate antenna portion MA1-1, and the second intermediate antenna portion MA2-1 may be disposed in the active area ANL-AA, and the third intermediate antenna portion MA3-1 and the second antenna portion AP2-1 may be disposed in the peripheral area ANL-NAA. However, embodiments of the present inventive concepts are not limited thereto.

The plurality of antenna pads, such as the first to fourth antenna pads ANP1, ANP2, ANP3, and ANP4, may respectively supply the plurality of antennas, such as the first to fourth antennas ANT1-1, ANT2-1, ANT3-1, and ANT4-1, with different powers. Therethrough, beam forming of the plurality of antennas, such as the first to fourth antennas ANT1-1, ANT2-1, ANT3-1, and ANT4-1, may be adjusted. The beamforming may form a radio wave beam so that the plurality of antennas, such as the first to fourth antennas ANT1-1, ANT2-1, ANT3-1, and ANT4-1, have directionality to radiate or receive a signal in a desired specific direction.

The signal may be a super high frequency (SHF) signal or an extremely high frequency (EHF) signal having a band of high frequencies. According to an embodiment of the present inventive concepts, however, the beamforming of the plurality of antennas, such as the first to fourth antennas ANT1-1, ANT2-1, ANT3-1, and ANT4-1, may be adjusted by adjusting power supplied to each of the plurality of antennas, and energy may be increased by concentrating a signal toward a specific direction. In addition, radiation efficiency may be increased because a desired radiation pattern may be formed. Accordingly, the electronic device DD (see FIG. 1A) having an increased transmission distance for the signal may be provided.

Further, according to an embodiment of the present inventive concepts, the plurality of antennas, such as the first to fourth antennas ANT1-1, ANT2-1, ANT3-1, and ANT4-1, may constitute an array antenna, and an array gain and interference reduction may be increased. Accordingly, the electronic device DD (see FIG. 1A) with an increased antenna gain may be provided.

According to an embodiment of the present inventive concepts, the antenna may include the first pattern portion, the plurality of intermediate pattern portions, and the second pattern portion connected to each other in the first direction. The bandwidth of a signal the antenna transmits, receives, or transmits and receives may be increased, and the total antenna gam of the antenna may be enhanced in the frequency band of the signal. Accordingly, the antenna with reduced loss may be provided in transmitting, receiving, or transmitting and receiving a signal. Also, the directionality of the antenna may be increased. Directionality may be a property of an antenna having directional concentration. For example, an antenna with increased directionality may easily receive, transmit, or transmit and receive a signal having directionality. The antenna may have increased concentration of an antenna gain. Accordingly, the electronic device may have increased communication efficiency and transmission distance for a signal.

Although embodiments of the present inventive concepts have been described herein, it is understood that various changes and modifications can be made by those skilled in the art within the spirit and scope of the present inventive concepts. Therefore, the embodiments described herein are not intended to limit the technical spirit and scope of the present inventive concepts.

What is claimed is:

1. An electronic device comprising:

a display panel including an antenna, the antenna comprises:

a first antenna portion;

a second antenna portion spaced apart from the first antenna portion in a first direction; and a plurality of intermediate antenna portions disposed between the first antenna portion and the second antenna portion and electrically connected to the first antenna portion and the second antenna portion, wherein the first antenna portion comprises a first pattern portion and a first line portion having a first width in a second direction crossing the first direction, and the second antenna portion comprises a second pattern portion and a second line portion having a second width in the second direction that is larger than the first width, wherein the first antenna portion is matched at a first impedance equal to intrinsic impedance of free space, wherein the first antenna portion is configured to radiate a first signal having a first frequency only through traveling wave resonance, and the plurality of intermediate antenna portions is configured to radiate at least one second signal having a different frequency than the first signal through the traveling wave resonance and a standing wave resonance.

2. The electronic device of claim 1, wherein the first antenna portion, the plurality of intermediate antenna portions, and the second antenna portion are arranged in the first direction.

3. The electronic device of claim 1, wherein a first length in the first direction of the first line portion is substantially same as a second length in the first direction of the second line portion.

4. The electronic device of claim 1, wherein the antenna is matched at a second impedance lower than the first impedance.

5. The electronic device of claim 1, wherein:

the plurality of intermediate antenna portions comprise a first intermediate antenna portion, a second intermediate antenna portion, and a third intermediate antenna portion, wherein:

the first intermediate antenna portion is disposed between the first antenna portion and the second intermediate antenna portion, the second intermediate antenna portion is disposed between the first intermediate antenna portion and the third intermediate antenna portion, and the third intermediate antenna portion is disposed between the second antenna portion and the second intermediate antenna portion.

6. The electronic device of claim 5, wherein the first line portion connects the first pattern portion and the first intermediate antenna portion.

7. The electronic device of claim 5, wherein:

the first intermediate antenna portion comprises a first intermediate pattern portion and a first intermediate line portion having a third width in the second direction that is larger than the first width and smaller than the second width;

the second intermediate antenna portion comprises a second intermediate pattern portion and a second intermediate line portion having a fourth width in the second direction that is larger than the third width; and the third intermediate antenna portion comprises a third intermediate pattern portion and a third intermediate line portion having a fifth width in the second direction that is larger than the fourth width.

8. The electronic device of claim 7, wherein the second width is larger than the fifth width.

9. The electronic device of claim 1, wherein the antenna has a mesh structure that includes a plurality of openings.

10. The electronic device of claim 1, wherein:

the antenna transmits, receives, or transmits and receives a signal having a frequency band; and the signal is radiated through a traveling wave resonance and a standing wave resonance.

11. The electronic device of claim 10, wherein:

the frequency band comprises a first frequency and a second frequency different from the first frequency, and the signal comprises a first signal having the first frequency and a second signal having the second frequency, wherein:

the first signal is radiated only through the traveling wave resonance, and the second signal is radiated through the traveling wave resonance and the standing wave resonance.

12. The electronic device of claim 1, wherein the display panel includes an active area and a peripheral area adjacent to the active area;

the antenna comprises a plurality of antennas, the plurality of antennas are disposed in the active area; and the plurality of antennas are arranged in the first direction.

13. An electronic device comprising:

a display panel including an active area and a peripheral area adjacent to the active area; and an antenna disposed on the active area and configured to transmit, receive, or transmit and receive a signal having a frequency band, wherein:

the antenna comprises a plurality of antenna portions arranged in a first direction, one of the plurality of antenna portions is matched at an impedance equal to intrinsic impedance of free space, and the signal is radiated through a traveling wave resonance and a standing wave resonance.

14. The electronic device of claim 13, wherein the plurality of antenna portions comprise a first antenna portion, a second antenna portion spaced apart from the first antenna portion in the first direction, and a plurality of intermediate antenna portions disposed between the first antenna portion and the second antenna portion.

15. The electronic device of claim 14, wherein:

the plurality of intermediate antenna portions comprise a first intermediate antenna portion, a second intermediate antenna portion, and a third intermediate antenna portion, wherein:

the first intermediate antenna portion is disposed between the first antenna portion and the second intermediate antenna portion, the second intermediate antenna portion is disposed between the first intermediate antenna portion and the third intermediate antenna portion, and the third intermediate antenna portion is disposed between the second antenna portion and the second intermediate antenna portion.

16. The electronic device of claim 15, wherein:

the first antenna portion is matched at a first impedance equal to the intrinsic impedance of free space;

the first antenna portion and the first intermediate antenna portion are matched at a second impedance that is lower than the first impedance;

the first antenna portion, the first intermediate antenna portion, and the second intermediate antenna portion are matched at a third impedance that is lower than the second impedance;

the first antenna portion, the first intermediate antenna portion, the second intermediate antenna portion, and the third intermediate antenna portion are matched at a fourth impedance that is lower than the third impedance; and the first antenna portion, the first intermediate antenna portion, the second intermediate antenna portion, the third intermediate antenna portion, and the second antenna portion are matched at a fifth impedance that is lower than the fourth impedance.

17. The electronic device of claim 13, further comprising a sensing electrode disposed on the display panel, wherein the sensing electrode and the antenna are disposed in the same layer.

18. The electronic device of claim 13, wherein the frequency band comprises about 26.5 GHz (Gigahertz) to about 29.5 GHz.

19. An electronic device comprising:

a display panel including an antenna, the antenna comprises:

a first antenna portion disposed on a first end of the antenna and including a first pattern portion and a first line portion, wherein the first antenna portion is matched at a first impedance equal to intrinsic impedance of free space;

a second antenna portion disposed on a second end of the antenna, the second antenna portion including a second pattern portion and a second line portion, the second antenna portion is spaced apart from the first antenna portion in a first direction; and a plurality of intermediate antenna portions disposed between the first antenna portion and the second antenna portion and electrically connected to the first antenna portion and the second antenna portion, each of the plurality of intermediate antenna portions includes an intermediate pattern portion and an intermediate line portion, wherein the first antenna portion is configured to radiate a first signal having a first frequency only through traveling wave resonance, and the plurality of intermediate antenna portions is configured to radiate at least one second signal having a different frequency than the first signal through the traveling wave resonance and a standing wave resonance.

20. The electronic device of claim 19, wherein:

the plurality of intermediate antenna portions comprise a first intermediate antenna portion, a second intermediate antenna portion, and a third intermediate antenna portion, wherein:

the first intermediate antenna portion is disposed between the first antenna portion and the second intermediate antenna portion and is configured to radiate a first second signal at a second frequency through the traveling wave resonance and the standing wave resonance;

the second intermediate antenna portion is disposed between the first intermediate antenna portion and the third intermediate antenna portion and is configured to radiate a second second signal at a third frequency through the traveling wave resonance and the standing wave resonance; and the third intermediate antenna portion is disposed between the second antenna portion and the second intermediate antenna portion and is configured to radiate a third second signal at a fourth frequency through the traveling wave resonance and the standing wave resonance.

21. The electronic device of claim 19, wherein:

the antenna is electrically connected to an antenna pad; and the second antenna portion is impedance matched to the antenna pad.

22. The electronic device of claim 19, wherein:

the electronic device includes an input sensor disposed on the display panel, the input sensor including a sensing area having a plurality of sensors for sensing an external input and an antenna area; and the antenna is disposed in the antenna area.

23. The electronic device of claim 19, wherein:
the antenna comprises a plurality of antennas, the plurality of antennas are disposed in the active area; and
the plurality of antennas are arranged in the first direction.

* * * * *